US012238803B2

(12) United States Patent
Chun et al.

(10) Patent No.: US 12,238,803 B2
(45) Date of Patent: Feb. 25, 2025

(54) METHOD AND DEVICE FOR CONTROLLING CONFIGURATION RELATED TO SIDELINK COMMUNICATION IN WIRELESS COMMUNICATION SYSTEM

(71) Applicant: LG Electronics Inc., Seoul (KR)

(72) Inventors: Sung Duck Chun, Seoul (KR); Lae Young Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 342 days.

(21) Appl. No.: 17/772,379

(22) PCT Filed: Oct. 28, 2020

(86) PCT No.: PCT/KR2020/014776
§ 371 (c)(1),
(2) Date: Apr. 27, 2022

(87) PCT Pub. No.: WO2021/091153
PCT Pub. Date: May 14, 2021

(65) Prior Publication Data
US 2023/0007721 A1 Jan. 5, 2023

(30) Foreign Application Priority Data

Nov. 7, 2019 (KR) .................. 10-2019-0141990

(51) Int. Cl.
H04W 4/00 (2018.01)
H04W 76/11 (2018.01)
(Continued)

(52) U.S. Cl.
CPC ............ H04W 76/19 (2018.02); H04W 76/11 (2018.02); H04W 92/18 (2013.01)

(58) Field of Classification Search
CPC ...... H04W 76/19; H04W 76/11; H04W 92/18
See application file for complete search history.

(56) References Cited

U.S. PATENT DOCUMENTS

2016/0157254 A1* 6/2016 Novlan ................ H04W 72/02
370/329
2017/0156059 A1 6/2017 Palat et al.
(Continued)

OTHER PUBLICATIONS

LG Electronics, Motorola Mobility, Lenovo, Convida Wireless, InterDigital, OPPO, vivo Mobile Communications Co. Ltd., "TS 23.287 Procedure for PC5 unicast", SA WG2 Meeting #132, Apr. 8-12, 2019, S2-1904432.
(Continued)

Primary Examiner — Abdelnabi O Musa
(74) Attorney, Agent, or Firm — BRYAN CAVE LEIGHTON PAISNER LLP

(57) ABSTRACT

The present disclosure relates to a method for operating a terminal and a base station in a wireless communication system and an apparatus for supporting the same. In an embodiment of the present disclosure, a method for operating a user equipment (UE) in a wireless communication system may include, performing communication through a link established between the UE and another UE; transmitting a first message for requesting an update of an identifier of the link; receiving a second message for responding to the first message; and reestablishing a packet data convergence protocol (PDCP) entity of the UE based on the update of the identifier.

10 Claims, 19 Drawing Sheets

(51) Int. Cl.
*H04W 76/19* (2018.01)
*H04W 92/18* (2009.01)

(56) References Cited

U.S. PATENT DOCUMENTS

| | | | | |
|---|---|---|---|---|
| 2020/0045594 | A1* | 2/2020 | Peng | H04W 76/15 |
| 2020/0205209 | A1* | 6/2020 | Pan | H04W 72/51 |
| 2020/0314613 | A1* | 10/2020 | Lee | H04W 4/46 |
| 2020/0329513 | A1* | 10/2020 | Pan | H04W 76/11 |
| 2020/0351699 | A1* | 11/2020 | Pan | H04W 28/0268 |
| 2020/0413467 | A1* | 12/2020 | Pan | H04W 72/04 |
| 2021/0345433 | A1* | 11/2021 | Pan | H04W 72/04 |

OTHER PUBLICATIONS

ZTE Corporation et al., Discussion on PC5 RRC procedure for unicast, R2-1912385, 3GPP TSG RAN WG2 #107b, Chongqing, China, Oct. 3, 2019, see pp. 1-10 and figure 1.

ZTE Corporation et al., Discussion on left issue of NR V2X PDCP, R2-1912382, 3GPP TSG RAN WG2 #107b, Chongqing, China, Oct. 3, 2019, see pp. 1-5.

Samsung, PC5 unicast, S2-1903245, 3GPP TSG SA WG2 #132, Xi'an, China, Apr. 2, 2019, see pp. 1-11.

Oppo, Discussion on network involvement in unicast link management, R2-1908729, 3GPP TSG RAN WG2 #107, Prague, Czech, Aug. 16, 2019, see pp. 1-8.

Qualcomm Incorporated, PC5-RRC and PC5-S interactions and their security in NR V2X, R2-1913510, 3GPP TSG RAN WG2 #107b, Chongqing, China, Oct. 3, 2019, see pp. 1-7.

"3rd Generation Partnership Project; Technical Specification Group Services and System Aspects; Architecture enhancements for 5G System (5GS) to support Vehicle-to-Everything (V2X) Services (Release 16)," 3GPP TS 23.287, 3GPP Generation Partnership Project, Mobile Competence Centre; France, No. Vo.3.0. Apr. 16, 2019, pp. 1-40.

Anonymous, "3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786, 3rd Generation Partnership Project (3GPP) Mobile Competence Centre, France, No. V16.0.0, Mar. 28, 2019, pp. 1-118.

* cited by examiner

METHOD AND DEVICE FOR CONTROLLING CONFIGURATION RELATED TO SIDELINK COMMUNICATION IN WIRELESS COMMUNICATION SYSTEM

CROSS REFERENCE TO RELATED APPLICATION

This application is the National Stage filing under 35 U.S.C. 371 of International Application No. PCT/KR2020/014776 filed on Oct. 28, 2020, which claims priority to Korean Patent Application No. 10-2019-0141990 filed on Nov. 7, 2019, the contents of which are all hereby incorporated by reference herein in their entirety.

BACKGROUND OF THE INVENTION

Technical Field

The present disclosure relates to a wireless communication system and, more particularly, to a method and apparatus for controlling a configuration associated with sidelink communication in a wireless communication system.

Background Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

DISCLOSURE

Technical Problem

The present disclosure may provide a method and apparatus for effectively controlling a configuration associated with sidelink communication in a wireless communication system.

The present disclosure may provide an apparatus and method for changing an identifier associated with sidelink for unicast communication in a wireless communication system.

The present disclosure may provide an apparatus and method for reestablishing an entity of a lower layer according to a change of an identifier associated with sidelink for unicast communication in a wireless communication system.

The present disclosure may provide an apparatus and method for managing a context of link according to a change of an identifier associated with sidelink for unicast communication in a wireless communication system.

The technical objects to be achieved in the present disclosure are not limited to the above-mentioned technical objects, and other technical objects that are not mentioned may be considered by those skilled in the art through the embodiments described below.

Technical Solution

In an embodiment of the present disclosure, a method for operating a user equipment (UE) in a wireless communication system may include, performing communication through a link established between the UE and another UE; transmitting a first message for requesting an update of an identifier of the link; receiving a second message for responding to the first message; and reestablishing a packet data convergence protocol (PDCP) entity of the UE based on the update of the identifier.

In an embodiment of the present disclosure, a user equipment in a wireless communication system includes a transceiver and at least one processor coupled with the transceiver. The at least one processor may be configured to perform communication through a link established between the UE and another UE, to enable the transceiver to transmit a first message for requesting an update of an identifier of the link, to enable the transceiver to receive a second message for responding to the first message, and to reestablish a packet data convergence protocol (PDCP) entity of the UE based on the update of the identifier.

The above-described aspects of the present disclosure are only a part of the preferred embodiments of the present disclosure, and various embodiments reflecting technical features of the present disclosure may be derived and understood by those skilled in the art based on the detailed description of the present disclosure provided below.

Advantageous Effects

The following effects may be produced by embodiments based on the present disclosure.

According to the present disclosure, malicious tracking for sidelink communication may be prevented.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

DESCRIPTION OF DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

MODE FOR INVENTION

Figure 1:
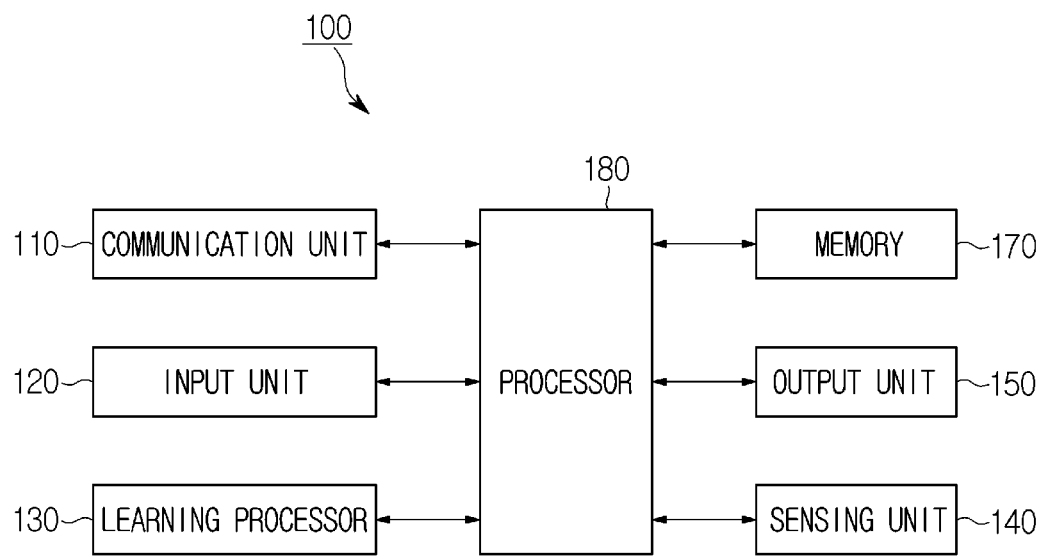
FIG. 1 is a view illustrating a device to which the present disclosure is applicable.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B (eNB)", "gNode B (gNB)", "ng-eNB", "advanced base station (ABS)", or "access point".

Also, in the embodiments of the present disclosure, "terminal" may be replaced by such terms as "user equipment (UE)", "mobile station (MS)", "subscriber station (SS)", "mobile subscriber station (MSS)", "mobile terminal" or "advanced mobile station (AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

*For clarity of explanation, the descriptions below are based on a 3GPP communication system (e.g., LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx" means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

3GPP LTE/LTE-A will be mainly focused on to clarify the descriptions below, but the technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an IP based packet switched core network, and an access network such as LTE and UTRAN. The EPS is a network of an evolved version of a universal mobile telecommunications system (UMTS).

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE can be called a terminal, a mobile equipment (ME), a mobile station (MS), etc. The UE can be a portable device such as a notebook computer, a cellular phone, a personal digital assistant (PDA), a smart phone, and a multimedia device, or a fixed device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN Service Capability Exposure Function (SCEF): an entity within the 3GPP architecture for service capability exposure that provides a means to safely expose the services and capabilities provided by 3GPP network interfaces.

Mobility Management Entity (MME): A network node in the EPS network which performs mobility management and session management functions.

Packet Data Network Gateway (PDN-GW): A network node in the EPS network which performs UE IP address allocation, packet screening and filtering, and charging data collection functions.

Serving GW (Serving Gateway): A network node in the EPS network which performs functions such as mobility anchor, packet routing, idle mode packet buffering, and triggering paging for the ME of MME.

Policy and Charging Rule Function (PCRF): A node in the EPS network which performs policy decision to dynamically apply differentiated QoS and billing policies for each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): A network in which a server (e.g., MMS server, WAP server, etc.) supporting a specific service is located.

PDN connection: A connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a 51 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this can be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of mega bits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, for VR games, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will be focused on only abnormal traffics, which cannot be identified by a vehicle itself.

Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligent robot.

A robot may be classified for industry, medical treatment, home, and military based on its use purpose or field.

A robot includes a driver including an actuator or motor, and can perform various physical operations, such as moving a robot joint. Furthermore, a movable robot includes a wheel, a brake, a propeller, etc. in a driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed, such as adaptive cruise control, a technology for automatically driving along a fixed path, a technology for automatically setting a path when a destination is set and driving, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used to supplement a real object. In contrast, unlike in the AR technology, in the MR technology, a virtual object and a real object are used as the same character.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 is a view illustrating a device to which the present disclosure is applicable.

The device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170, and a processor 180.

The communication unit 110 may transmit and receive data to and from external devices, such as other devices 100a to 100er or an AI server 200, using wired and wireless communication technologies. For example, the communication unit 110 may transmit and receive sensor information, a user input, a learning model, and a control signal to and from external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and a signal obtained from the camera or the microphone may be called sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model configured with an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with the learning processor 240 of the AI server 200.

The learning processor 130 may include a memory integrated or implemented in the device 100. Alternatively, the learning processor 130 may be implemented using the memory 170, an external memory directly coupled to the device 100, or a memory maintained in an external device.

The sensing unit 140 can obtain at least one of internal information of the device 100, surrounding environment information of the device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar, etc.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the device 100. For example, the memory 170 can store input data obtained by the input unit 120, learning data, a learning model, a learning history, etc.

The processor 180 can determine at least one executable operation of the Device 100 based on information that is determined or generated using a data analysis algorithm or a machine learning algorithm. Furthermore, the processor 180 can perform the determined operation by controlling the components of the device 100.

To this end, the processor 180 can request, search, receive, and use data of the learning processor 130 or the memory 170, and can control the components of the Device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the Device 100 or the feedback of a user for an operation, may store the history information in the memory 170 or the learning processor 130, or may transmit the history information to an external device, such as the AI server 200. The collected history information may be used to update a learning model.

The processor 18 may control at least some of the components of the Device 100 in order to execute an application program stored in the memory 170. Moreover, the processor 180 may combine and operate two or more of the components included in the Device 100 in order to execute the application program.

Figure 2:
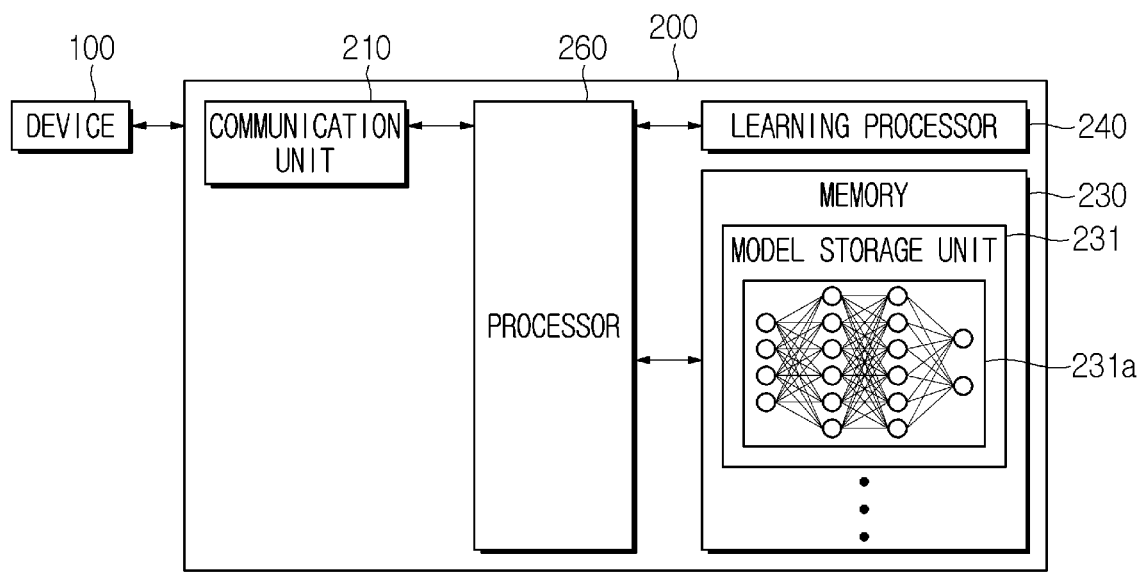
FIG. 2 is a view illustrating an artificial intelligence (AI) server to which the present disclosure is applicable.

FIG. 2 is a view illustrating an artificial intelligence (AI) server to which the present disclosure is applicable.

Referring to FIG. 2, the AI server 200 may mean a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the device 100 and may perform at least some of AI processing.

The AI server 200 may include a communication unit 210, a memory 230, a learning processor 240 and a processor 260.

The communication unit 210 may transmit and receive data to and from an external device, such as the device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the device 100, and used.

The learning model may be implemented as hardware, software or a combination of hardware and software. If a part or all of the learning model is implemented as software, one or more instructions configuring the learning model may be stored in the memory 230.

The processor 260 may deduce a result value of new input data using the learning model, and may generate a response or control command based on the deduced result value.

Figure 3:
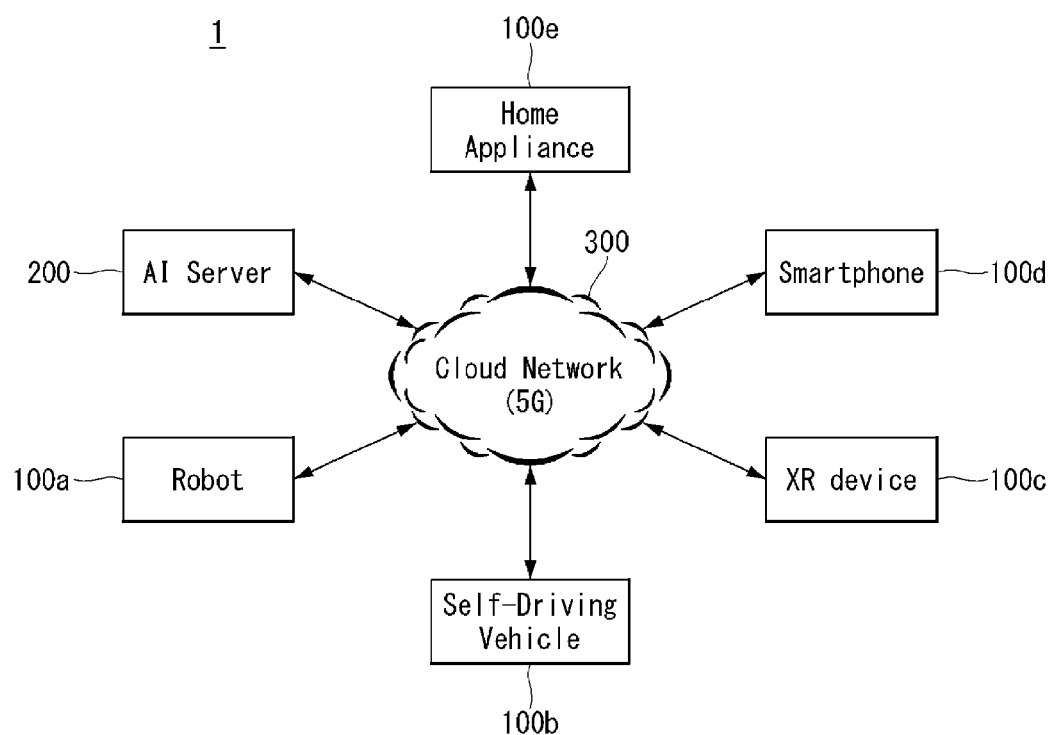
FIG. 3 is a view illustrating an AI system to which the present disclosure is applicable.

FIG. 3 is a view illustrating an AI system to which the present disclosure is applicable.

Referring to FIG. 3, the AI system 1 is connected to at least one of the AI server 200, a robot 100a, a self-driving vehicle 100b, an XR device 100c, a smartphone 100d or home appliances 100e over a cloud network 300. In this case, the robot 100a, the self-driving vehicle 100b, the XR device 100c, the smartphone 100d or the home appliances 100e to which the AI technology is applied may be called devices 100a to 100e.

The cloud network 300 may constitute part of cloud computing infra or may mean a network present within cloud computing infra. Here, the cloud network 300 may be configured using the 3G network, the 4G or long term evolution (LTE) network or the 5G network.

That is, the devices 100a to 100e and 200 constituting the AI system 1 may be interconnected over the cloud network 300. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are devices constituting the AI system 1, over the cloud network 300, and may help at least some of the AI processing of the connected devices 100a to 100e.

The AI server 200 can train an artificial neural network based on a machine learning algorithm in place of the devices 100a to 100e, and can directly store a learning model or transmit the learning model to the devices 100a to 100e.

The AI server 200 can receive input data from the devices 100a to 100e, deduce a result value of the received input data using the learning model, generate a response or control command based on the deduced result value, and transmit the response or control command to the devices 100a to 100e.

Alternatively, the devices 100a to 100e can directly deduce a result value of input data using a learning model, and can generate a response or control command based on the deduced result value.

Various implementations of the devices 100a to 100e to which the above-described technologies are applied are described below. Herein, the devices 100a to 100e illustrated in FIG. 3 may be considered to be detailed implementations of the device 100 illustrated in FIG. 1.

AI and Robot to which the Present Disclosure is Applicable

An AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain state information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor among LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Here, the learning model may have been directly trained in the robot 100a or may have been trained in an external device, such as the AI server 200.

The robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI and Self-Driving to which the Present Disclosure is Applicable

An AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain state information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information about the environment or the object from external devices, or may receive information about the environment or object that is directly recognized from the external devices.

The self-driving vehicle 100b may perform the above operations using a learning model consisting of at least one artificial neural network. For example, the self-driving vehicle 100b may recognize a surrounding environment and object using a learning model and determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model to perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 100b may perform an operation or run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

An AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI, Robot and Self-Driving to which the Present Disclosure is Applicable

An AI technology and a self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing technique in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

An AI technology and an XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI, Self-Driving and XR to which the Present Disclosure is Applicable

An AI technology and an XR technology are applied to the self-driving vehicle 100b, and the self-driving vehicle 100b may be implemented as a mobile robot, a vehicle, an unmanned aerial vehicle, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100b may operate based on a control signal received through an external device, such as the XR device 100c, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

Figure 4:
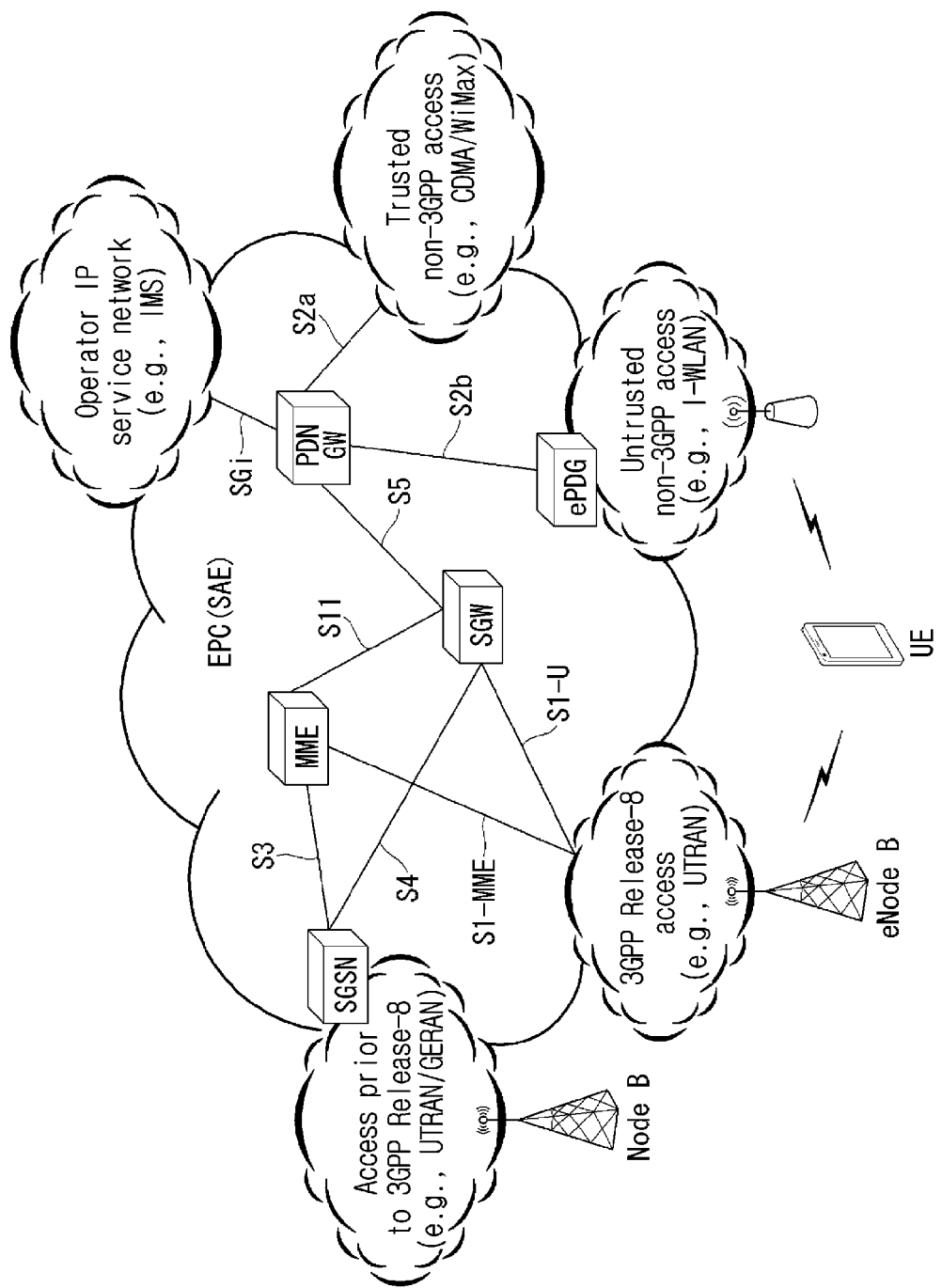
FIG. 4 is a view illustrating various reference points.

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions such as security procedures, terminal-to-network session handling, idle terminal location management, and so on.

The SGSN handles all packet data such as mobility management and authentication of the user for another 3GPP network (e.g., GPRS network).

The ePDG serves as a security node for an untrusted non-3GPP network (e.g., I-WLAN, Wi-Fi hotspot, etc.)

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| reference point | description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator |

TABLE 1-continued

| reference point | description |
|---|---|
| | external public or private packet data network or an intra operator packet data network, e.g. for provision of IMS services. This reference point corresponds to Gi for 3GPP accesses. |

Figure 5:
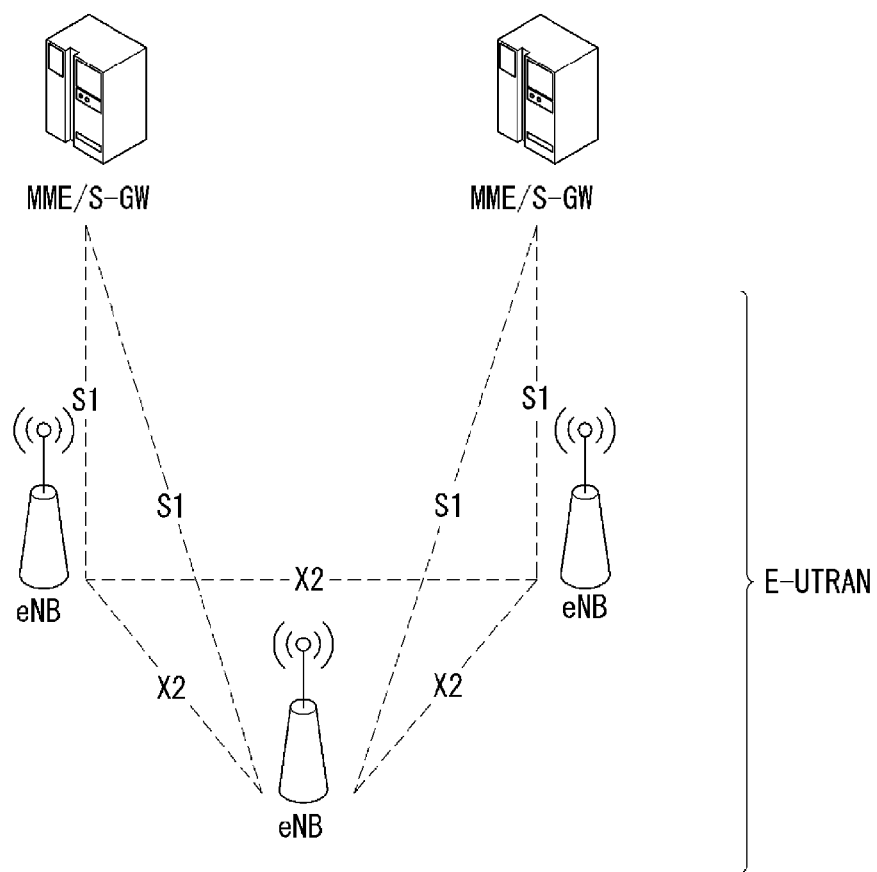
FIG. 5 is a view illustrating an example of a network structure of an evolved universal terrestrial radio access network (E-UTRAN) to which the present disclosure is applicable.

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW. FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

Figure 6:
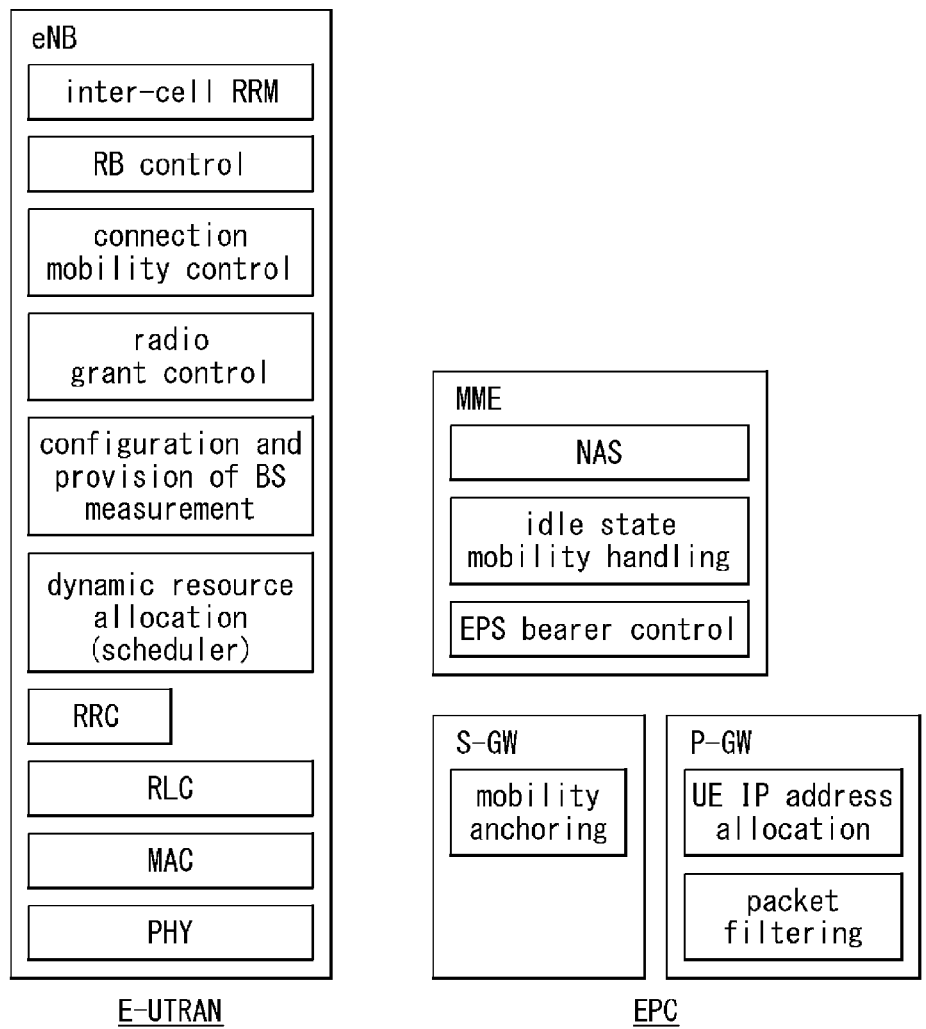
FIG. 6 is a view illustrating an example of a common architecture of a E-UTRAN and an evolved packet core (EPC).

FIG. 6 is a view illustrating an example of a common architecture of a E-UTRAN and an evolved packet core (EPC).

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

Figure 7:
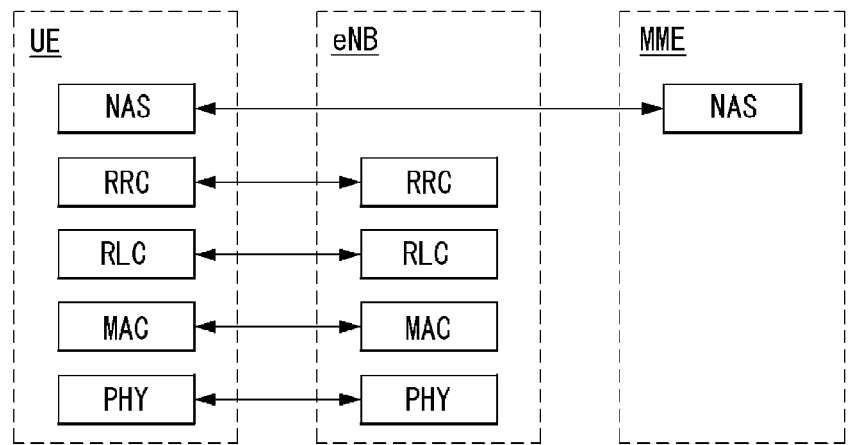
FIG. 7 is a view illustrating an example of a structure of a radio interface protocol in a control plane between a user equipment (UE) and an evolved node B (eNB).
Figure 8:
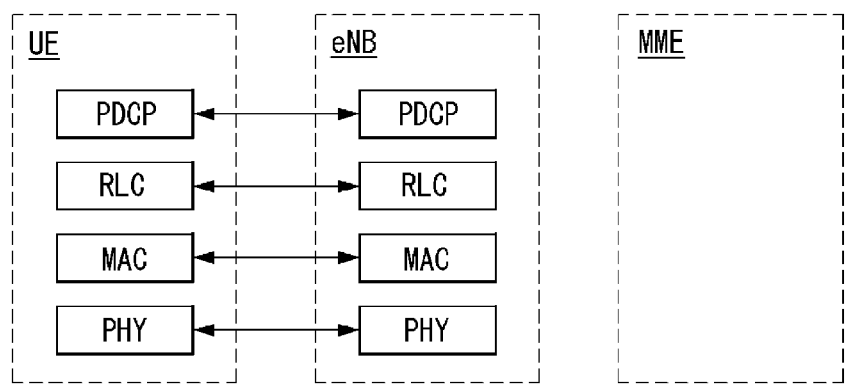
FIG. 8 is a view illustrating an example of a structure of a radio interface protocol in a user plane between an UE and an eNB.

FIG. 7 is a view illustrating an example of a structure of a radio interface protocol in a control plane between user equipment (UE) and evolved node B (eNB), and FIG. 8 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In addition, in the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, reconfiguration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer shown in FIG. 7 is described in detail below.

The evolved session management (ESM) belonging to the NAS layer performs functions such as default bearer management and dedicated bearer management to control the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

Figure 9:
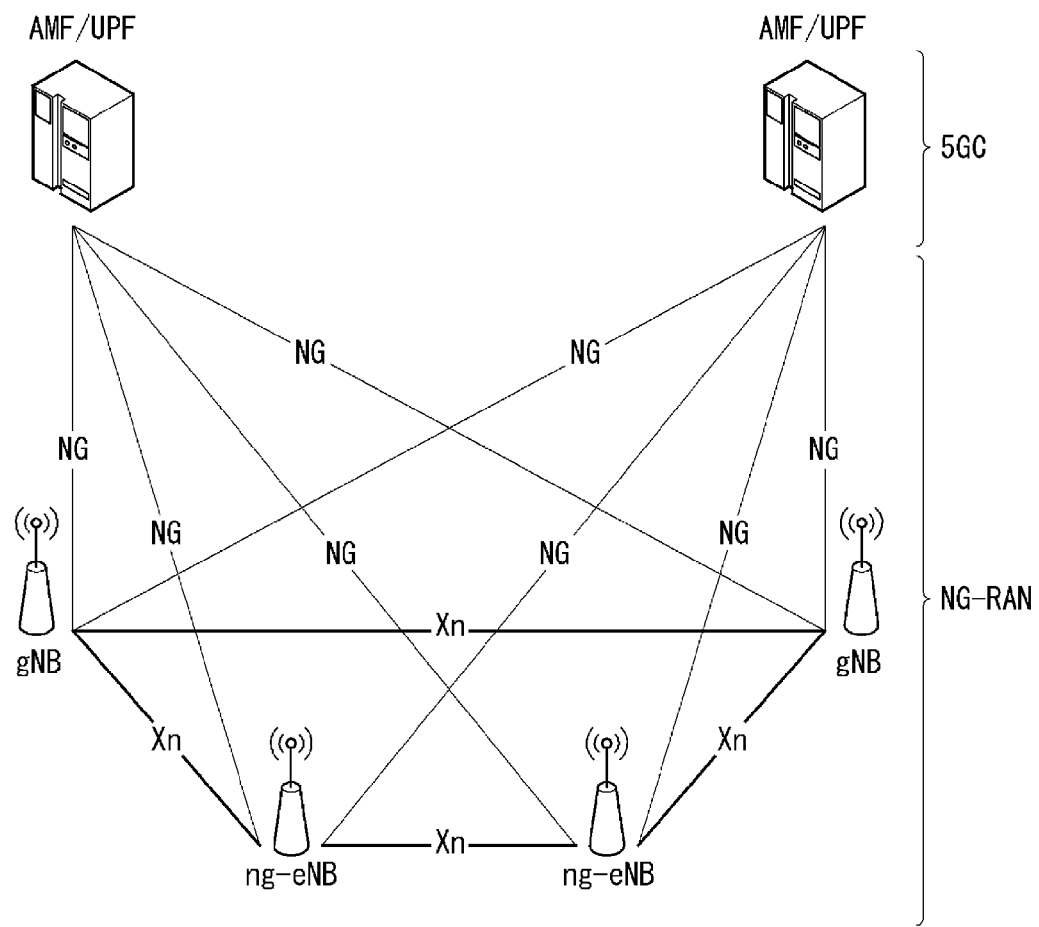
FIG. 9 is a view illustrating an example of a common architecture of a new radio (NR)-radio access network (RAN).

FIG. 9 is a view illustrating an example of a common architecture of a new radio (NR)-radio access network (RAN). Referring to FIG. 9, a NG-RAN node may be one of the following nodes.

gNB providing NR user plane and control plane protocols towards UE, or ng-eNB providing E-UTRA user plane and control plane protocols towards UE gNB and ng-eNB are connected to each other through an Xn interface. In addition, gNB and ng-eNB are connected to an access and mobility management function (AMF) and to a user plane function (UPF) through NG interfaces for 5GC, more particularly, through an NG-C interface and an NG-U interface respectively (refer to 3GPP TS 23.501 [3]).

For reference, an architecture for functional separation and an F1 interface are defined in 3GPP TS 38.401 [4].

Figure 10:
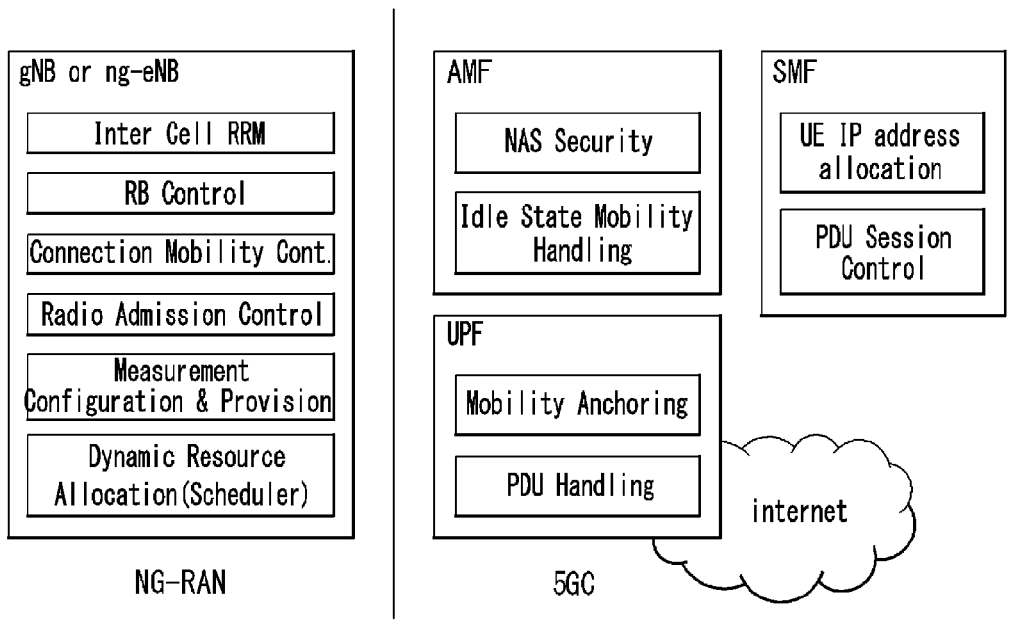
FIG. 10 is a view illustrating an example of common functional separation of a NG-RAN and a 5th generation core (5GC).
Figure 11:
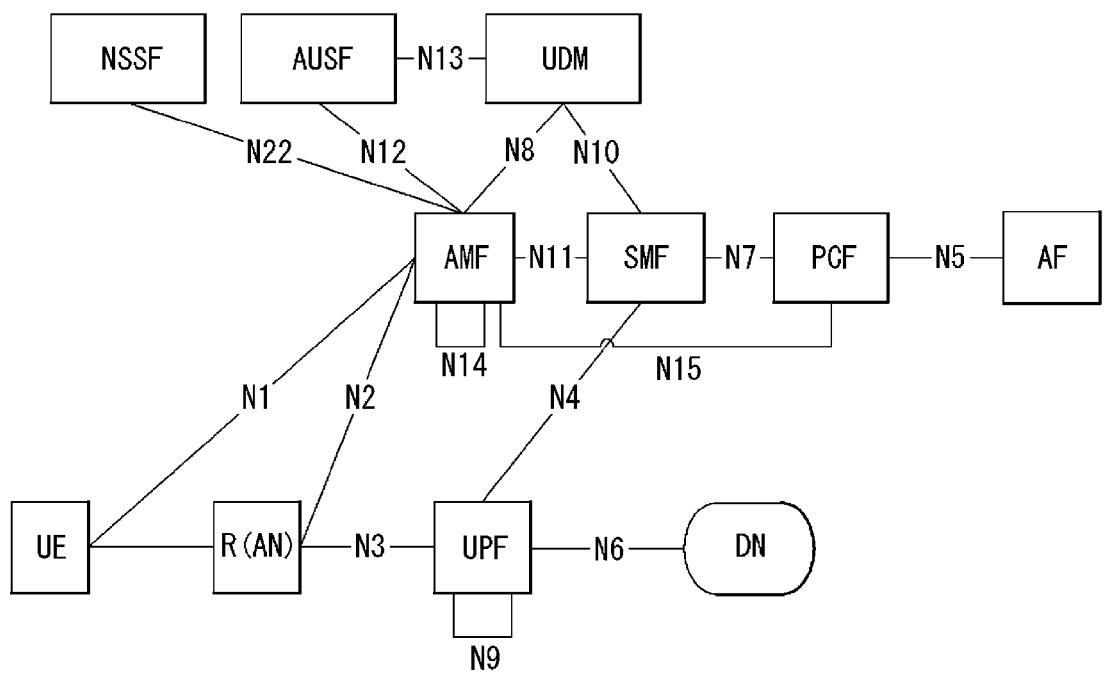
FIG. 11 is a view illustrating an example of a common architecture of a 5th generation (5G) system.

FIG. 10 is a view illustrating an example of common functional separation of a NG-RAN and a 5th generation core (5GC). Referring to FIG. 10, a yellow box represents logical nodes, and a white box represents a main function.

gNB and ng-eNB host the following functions.
        Wireless resource management function: wireless bearer control, wireless authentication control, access mobility control, and dynamic resource allocation for UE both in uplink and downlink (scheduling)
        IP header compression, encryption and data integrity protection
        Selecting AMF in IMT-2000 3GPP-UE attachment file, in case routing for AMF cannot be determined based on information provided from UE
        User plane data routing to UPF
        Forwarding control plane information to AMF
        Connection configuration and disconnection
        Paging message scheduling and transmission
        System broadcast information scheduling and transmission (provided in AMF or OAM)
        Measurement for mobility and scheduling and configuration of measurement report
        Transmission-level packet marking of uplink
        Session management
        Network slicing support
        QoS flow management and mapping for data wireless bearer
        Support of UE in RRC_INACTIVE state
        NAS message distribution function
        Radio access network share
        Dual connectivity
        Closed interworking between NR and E-UTRA AMF hosts the following main functions (refer to 3GPP TS 23.501 [3]).
    NAS signal termination
    NAS signal security
    AS security control
    Signal transfer between CN nodes for moving between 3GPP access networks
    Idle mode UE connectivity (including paging retransmission control and execution)
    Registration area management
    Mobility support inside system and between systems
    Access authentication
    Access authorization including confirmation of roaming authority
    Mobility management control (subscription and policy)
    Network slicing support
    SMF selection UPF hosts the following main functions (refer to 3GPP TS 23.501 [3]).
    Anchor point for intra-/inter-RAT mobility (if any)
    External PDU session point interconnected with data network
    Packet routing and forwarding
    Packet check and user plane part of policy rule enforcement
    Traffic usage report
    Uplink classifier supporting traffic flow to data network
    Bifurcation for multi-horned PDU session support
    QoS processing for user plane (e.g. packet filtering, gate, UL/DL rate enforcement)
    Uplink traffic certification (SDF and QoS flow mapping)
    Downlink packet buffering and downlink data notification triggering Session management function (SMF) hosts the following main functions (refer to 3GPP TS 23.501 [3]).
    Session management
    UE IP address allocation and management
    UP function selection and control
    Configuring traffic steering to route traffic to an appropriate destination in UPF
    Policy enforcement and partial control of QoS
    Downlink data notification FIG. 11 is a view illustrating an example of a common architecture of a 5th generation (5G) system. Hereinafter, each reference interface and each node in FIG. 11 will be described.

Access and mobility management function (AMF) supports such functions as signaling between CN nodes for mobility between 3GPP access networks, termination of a radio access network (RAN) CP interface (N2), termination of NAS signaling (N1), registration management (registration area), idle mode UE reachability, support of network slicing, and SMF selection.

Some or all the functions of AMF may be supported in a single instance of one AMF.

Data network (DN) means an operator service, an Internet access or 3rd party service and the like, for example. DN transmits a downlink protocol data unit (PDU) or receives a PDU from a UPF, which UE transmits.

Policy control function (PCF) receives information on a packet flow from an application server and provides a function of determining policies like mobility management and session management.

Session management function (SMF) provides a session management function, and when UE has a plurality of sessions, each session may be managed by different SMFs.

Some or all the functions of SMF may be supported in a single instance of one SMF.

Unified data management (UDM) stores a user's subscription data, policy data and the like.

User plane function (UPF) forwards a downlink PDU, which is received from a DN, to UE via (R)AN and forwards an uplink PDU, which is received from UE, to a DN via (R)AN.

Application function (AF) operates with a 3GPP core network for service provision (e.g., for supporting functions like application effect on traffic routing, network capability exposure access, mutual operation with policy framework for policy control).

(Radio) access network ((R)AN) collectively refers to new radio access networks that support both evolved E-UTRA, which is an evolved version of 4G radio access, and a new radio (NR) access technology (e.g. eNB).

gNB supports functions for wireless resource management (that is, radio bearer control, radio admission control, connection mobility control, dynamic allocation of resources to UE in uplink/downlink (that is, scheduling)).

User equipment (UE) means a user device.

In a 3GPP system, a conception link connecting NFs in a 5G system is defined as a reference point.

N1 means a reference point between UE and AMF, N2 means a reference point between (R)AN and AMF, N3 means a reference point between (R)AN and UPF, N4 means a reference point between SMF and UPF, N6 means a reference point between UPF and a data network, N9 means a reference point between 2 core UPFs, N5 means a reference point between PCF and AF, N7 means a reference point between SMF and PCF, N24 means a reference point between PCF in a visited network and PCF in a home network, N8 means a reference point between UDM and AMF, N10 means a reference point between UDM and SMF, N11 means a reference point between AMF and SMF, N12 means a reference point between AMF and authentication server function (AUSF), N13 means a reference point between UDM and AUSF, N14 means a reference point between 2 AMFs, N15 means a reference point between PCF and AMF in the case of non-roaming scenario and a reference point between PCF in a visited network and AMF in the case of a roaming scenario, N16 means a reference point between 2 SMFs (in a roaming scenario, a reference point between SMF in a visited network and SMF in a home network), N17 means a reference point between AMF and 5G-equipment identify register (EIR), N18 means a reference point between AMF and unstructured data storage function (UDSF), N22 means a reference point between AMF and network slice selection function (NSSF), N23 means a reference point between PCF and network data analytics function (NWDAF), N24 means a reference point between NSSF and NWDAF, N27 means a reference point between network repository function (NRF) in a visited network and NRF in a home network, N31 means a reference point between NSSF in a visited network and NSSF in a home network, N32 means a reference point between security protection proxy (SEPP) in a visited network and SEPP in a home network, N33 means a reference point between network exposure function and AF, N40 means a reference point between SMF and charging function (CHF), and N50 means a reference point between AMF and circuit bearer control function (CBCF).

Meanwhile, for convenience of explanation, FIG. 11 exemplifies a reference model for a case in which UE has an access to one DN by using one PDU session, but the present disclosure is not limited thereto.

For convenience of explanation, the above description was based on an EPS system using eNB, but it may be replaced by a 5G system by using gNB instead of eNB, AMF instead of mobility management (MM) function of MME, SMF as SM function of S/P-GW, and UPF as user plane-related function of S/P-GW.

In this specification, the above description was based on EPS, but corresponding contents may also be supported in a 5G system through similar operations through a process/message/information with similar objectives.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

Figure 12:
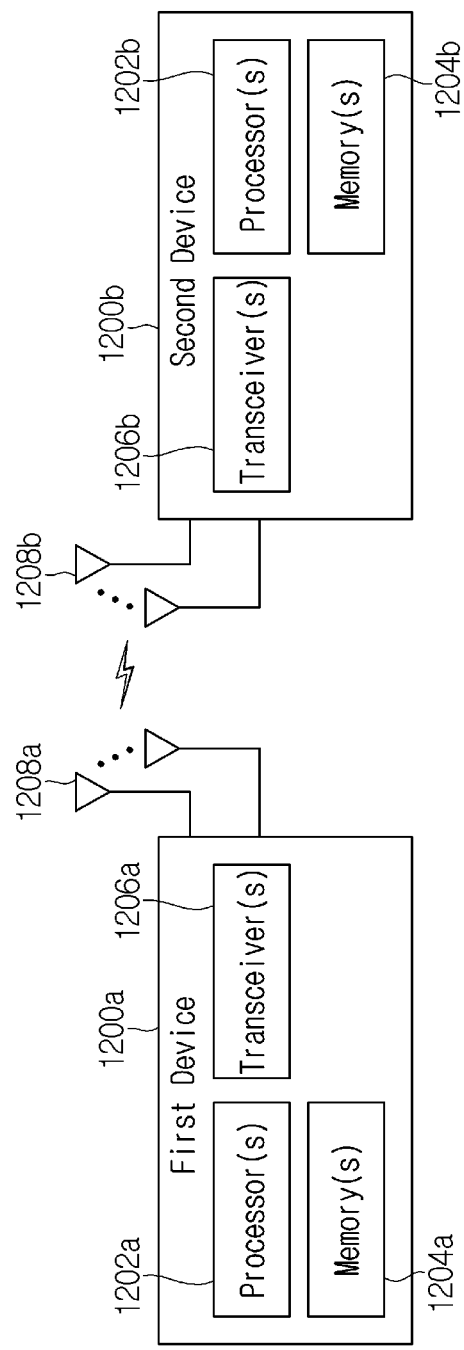
FIG. 12 is a view illustrating an example of a wireless device applicable to the present disclosure.

FIG. 12 is a view showing an example of a wireless device applicable to the present disclosure.

Referring to FIG. 12, a first wireless device 1200a and a second wireless device 1200b may transmit and receive radio signals through various radio access technologies (e.g., LTE or NR). Here, {the first wireless device 1200a, the second wireless device 1200b} may correspond to {the wireless device 100x, the base station 120} and/or {the wireless device 100x, the wireless device 100x} of FIG. 1.

The first wireless device 1200a may include one or more processors 1202a and one or more memories 1204a and may further include one or more transceivers 1206a and/or one or more antennas 1208a. The processor 1202a may be configured to control the memory 1204a and/or the transceiver 1206a and to implement descriptions, functions, procedures, proposals, methods and/or operational flowcharts disclosed herein. For example, the processor 1202a may process information in the memory 1204a to generate first information/signal and then transmit a radio signal including the first information/signal through the transceiver 1206a. In addition, the processor 1202a may receive a radio signal including second information/signal through the transceiver 1206a and then store information obtained from signal processing of the second information/signal in the memory 1204a. The memory 1204a may be coupled with the processor 1202a, and store a variety of information related to operation of the processor 1202a. For example, the memory 1204a may store software code including instructions for performing all or some of the processes controlled by the processor 1202a or performing the descriptions, functions, procedures, proposals, methods and/or operational flowcharts disclosed herein. Here, the processor 1202a and the memory 1204a may be part of a communication modem/circuit/chip designed to implement wireless communication technology (e.g., LTE or NR). The transceiver 1206a may be coupled with the processor 1202a to transmit and/or receive radio signals through one or more antennas 1208a. The transceiver 1206a may include a transmitter and/or a receiver. The transceiver 1206a may be used interchangeably with a radio frequency (RF) unit. In the present disclosure, the wireless device may refer to a communication modem/circuit/chip.

The second wireless device 1200b may include one or more processors 1202b and one or more memories 1204b and may further include one or more transceivers 1206b and/or one or more antennas 1208b. The processor 1202b may be configured to control the memory 1204b and/or the transceiver 1206b and to implement the descriptions, functions, procedures, proposals, methods and/or operational flowcharts disclosed herein. For example, the processor 1202b may process information in the memory 1204b to generate third information/signal and then transmit the third information/signal through the transceiver 1206b. In addition, the processor 1202b may receive a radio signal including fourth information/signal through the transceiver 1206b and then store information obtained from signal processing of the fourth information/signal in the memory 1204b. The memory 1204b may be coupled with the processor 1202b to store a variety of information related to operation of the processor 1202b. For example, the memory 1204b may store software code including instructions for performing all or some of the processes controlled by the processor 1202b or performing the descriptions, functions, procedures, proposals, methods and/or operational flowcharts disclosed herein. Herein, the processor 1202b and the memory 1204b may be part of a communication modem/circuit/chip designed to implement wireless communication technology (e.g., LTE or NR). The transceiver 1206b may be coupled with the processor 1202b to transmit and/or receive radio signals through one or more antennas 1208b. The transceiver 1206b may include a transmitter and/or a receiver. The transceiver 1206b may be used interchangeably with a radio frequency (RF) unit. In the present disclosure, the wireless device may refer to a communication modem/circuit/chip.

Hereinafter, the wireless communication technology implemented in the wireless devices 1200a and 1200b of the present disclosure may include not only LTE, NR and 6G but also narrowband Internet of Things (NB-IoT) for low-power communication. At this time, for example, NB-IoT technology may be an example of low-power wide area network (LPWAN) technology and may be implemented in standards such as LTE Cat NB1 and/or LTE Cat NB2, without being limited to the above-described names. Additionally or alternatively, the wireless communication technology implemented in the wireless devices 1200a and 1200b of the present disclosure may perform communication based on LTE-M technology. At this time, for example, the LTE-M technology may be an example of LPWAN technology and may be called various names such as enhanced machine type communication (eMTC). For example, the LTE-M technology may be implemented in at least one of various standards such as 1) LTE CAT 0, 12) LTE Cat M1, 3) LTE Cat M2, 4) LTE non-BL (non-Bandwidth Limited), 5) LTE-MTC, 6) LTE Machine Type Communication and/or 7) LTE M, without being limited to the above-described names Additionally or alternatively, the wireless communication technology implemented in the wireless devices 1200a and 1200b of the present disclosure may include at least one of ZigBee, Bluetooth or low-power wide area network considering low-power communication, without being limited to the above-described names. For example, ZigBee technology may generate personal area networks (PANs) related to small/low-power digital communication based on various standards such as IEEE 802.15.4 and may be called various names.

Hereinafter, hardware elements of the wireless devices 1200a and 1200b will be described in greater detail. Without being limited thereto, one or more protocol layers may be implemented by one or more processors 1202a and 1202b. For example, one or more processors 1202a and 1202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 1202a and 1202b may generate one or more protocol data units (PDUs) and/or one or more service data unit (SDU) according to the descriptions, functions, procedures, proposals, methods and/or operational flowcharts disclosed herein. One or more processors 1202a and 1202b may generate messages, control information, data or information according to the descriptions, functions, procedures, proposals, methods and/or operational flowcharts disclosed herein. One or more processors 1202a and 1202b may generate PDUs, SDUs, messages, control information, data or information according to the functions, procedures, proposals and/or methods disclosed herein and provide the PDUs, SDUs, messages, control information, data or information to one or more transceivers 1206a and 1206b. One or more processors 1202a and 1202b may receive signals (e.g., baseband signals) from one or more transceivers 1206a and 1206b and acquire PDUs, SDUs, messages, control information, data or information according to the descriptions, functions, procedures, proposals, methods and/or operational flowcharts disclosed herein.

One or more processors 1202a and 1202b may be referred to as controllers, microcontrollers, microprocessors or microcomputers. One or more processors 1202a and 1202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 1202a and 1202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 1202a and 1202b or stored in one or more memories 1204a and 1204b to be driven by one or more processors 1202a and 1202b. The descriptions, functions, procedures, proposals, methods and/or operational flowcharts disclosed herein implemented using firmware or software in the form of code, a command and/or a set of commands One or more memories 1204a and 1204b may be coupled with one or more processors 1202a and 1202b to store various types of data, signals, messages, information, programs, code, instructions and/or commands One or more memories 1204a and 1204b may be composed of read only memories (ROMs), random access memories (RAMs), erasable programmable read only memories (EPROMs), flash memories, hard drives, registers, cache memories, computer-readable storage mediums and/or combinations thereof. One or more memories 1204a and 1204b may be located inside and/or outside one or more processors 1202a and 1202b. In addition, one or more memories 1204a and 1204b may be coupled with one or more processors 1202a and 1202b through various technologies such as wired or wireless connection.

One or more transceivers 1206a and 1206b may transmit user data, control information, radio signals/channels, etc. described in the methods and/or operational flowcharts of the present disclosure to one or more other apparatuses. One or more transceivers 1206a and 1206b may receive user data, control information, radio signals/channels, etc. described in the methods and/or operational flowcharts of the present disclosure from one or more other apparatuses. For example, one or more transceivers 1206a and 1206b may be coupled with one or more processors 1202a and 1202b to transmit/receive radio signals. For example, one or more processors 1202a and 1202b may perform control such that one or more transceivers 1206a and 1206b transmit user data, control information or radio signals to one or more other apparatuses. In addition, one or more processors 1202a and 1202b may perform control such that one or more transceivers 1206a and 1206b receive user data, control information or radio signals from one or more other apparatuses. In addition, one or more transceivers 1206a and 1206b may be coupled with one or more antennas 1208a and 1208b, and one or more transceivers 1206a and 1206b may be configured to transmit/receive user data, control information, radio signals/channels, etc. described in the descriptions, functions, procedures, proposals, methods and/or operational flowcharts disclosed herein through one or more antennas 1208a and 1208b. In the present disclosure, one or more antennas may be a plurality of physical antennas or a plurality of logical antennas (e.g., antenna ports). One or more transceivers 1206a and 1206b may convert the received radio signals/channels, etc. from RF band signals to baseband signals, in order to process the received user data, control information, radio signals/channels, etc. using one or more processors 1202a and 1202b. One or more transceivers 1206a and 1206b may convert the user data, control information, radio signals/channels processed using one or more processors 1202a and 1202b from baseband signals into RF band signals. To this end, one or more transceivers 1206a and 1206b may include (analog) oscillator and/or filters.

Structure of Wireless Device Applicable to the Present Disclosure

Figure 13:
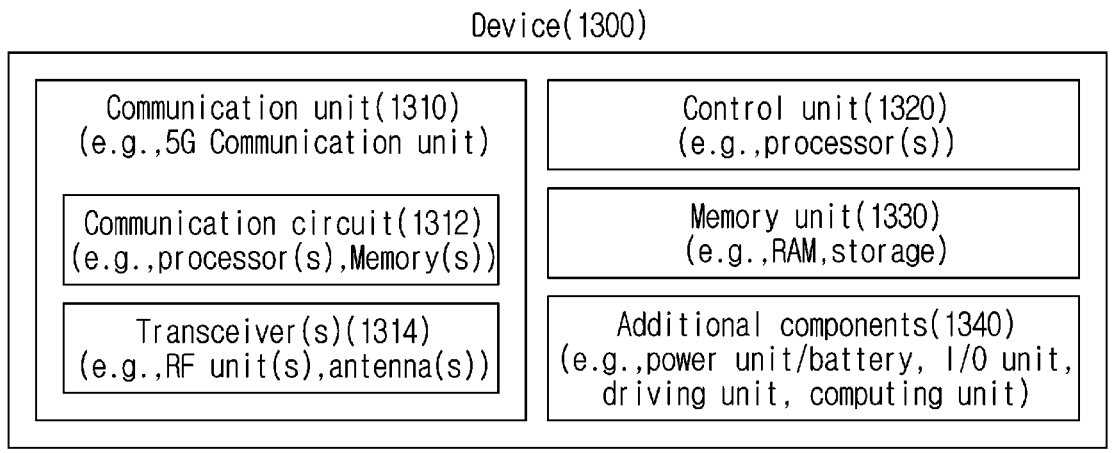
FIG. 13 is a view illustrating another example of a wireless device applicable to the present disclosure.

FIG. 13 is a view showing another example of a wireless device applicable to the present disclosure.

Referring to FIG. 13, a wireless device 1300 may correspond to the wireless devices 1200a and 1200b of FIG. 12 and include various elements, components, units/portions and/or modules. For example, the wireless device 1300 may include a communication unit 1310, a control unit (controller) 1320, a memory unit (memory) 1330 and additional components 1340. The communication unit may include a communication circuit 1312 and a transceiver(s) 1314. For example, the communication circuit 1312 may include one or more processors 1202a and 1202b and/or one or more memories 1204a and 1204b of FIG. 12. For example, the transceiver(s) 1314 may include one or more transceivers 1206a and 1206b and/or one or more antennas 1208a and 1208b of FIG. 12. The control unit 1320 may be electrically coupled with the communication unit 1310, the memory unit 1330 and the additional components 1340 to control overall operation of the wireless device. For example, the control unit 1320 may control electrical/mechanical operation of the wireless device based on a program/code/instruction/information stored in the memory unit 1330. In addition, the control unit 1320 may transmit the information stored in the memory unit 1330 to the outside (e.g., another communication device) through the wireless/wired interface using the communication unit 1310 over a wireless/wired interface or store information received from the outside (e.g., another communication device) through the wireless/wired interface using the communication unit 1310 in the memory unit 1330.

The additional components 1340 may be variously configured according to the types of the wireless devices. For example, the additional components 1340 may include at least one of a power unit/battery, an input/output unit, a driving unit or a computing unit. Without being limited thereto, the wireless device 1300 may be implemented in the form of the robot, the vehicles, the XR device, the hand-held device, the home appliance, the IoT device, a digital broadcast terminal, a hologram apparatus, a public safety apparatus, an MTC apparatus, a medical apparatus, a Fintech device (financial device), a security device, a climate/environment device, an AI server/device, the base station, a network node, etc. The wireless device may be movable or may be used at a fixed place according to use example/service.

In FIG. 13, various elements, components, units/portions and/or modules in the wireless device 1300 may be coupled with each other through wired interfaces or at least some thereof may be wirelessly coupled through the communication unit 1310. For example, in the wireless device 1300, the control unit 1320 and the communication unit 1310 may be coupled by wire, and the control unit 1320 and another component may be wirelessly coupled through the communication unit 1310. In addition, each element, component, unit/portion and/or module of the wireless device 1300 may further include one or more elements. For example, the control unit 1320 may be composed of a set of one or more processors. For example, the control unit 1320 may be composed of a set of a communication control processor, an application processor, an electronic control unit (ECU), a graphic processing processor, a memory control processor, etc. In another example, the memory unit 1330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 14:
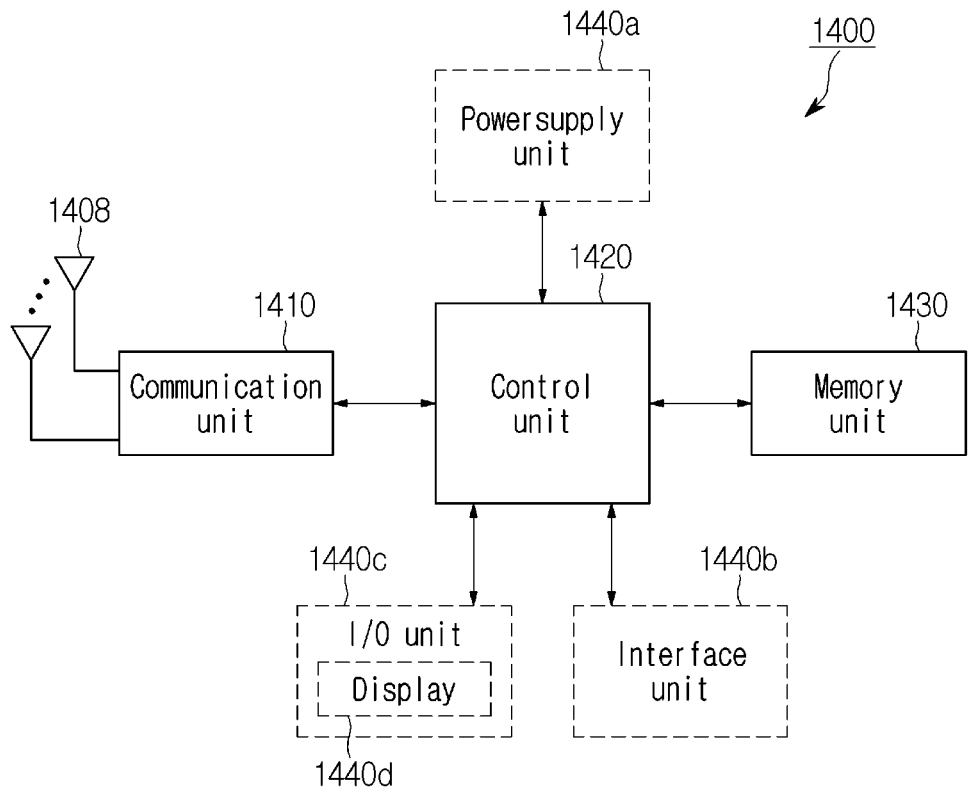
FIG. 14 is a view illustrating a hand-held device applicable to the present disclosure.

FIG. 14 is a view showing an example of a hand-held device applicable to the present disclosure.

FIG. 14 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 14, the hand-held device 1400 may include an antenna unit (antenna) 1408, a communication unit (transceiver) 1410, a control unit (controller) 1420, a memory unit (memory) 1430, a power supply unit (power supply) 1440a, an interface unit (interface) 1440b, and an input/output unit 1440c. An antenna unit (antenna) 1408 may be part of the communication unit 1410. The blocks 1410 to 1430/1440a to 1440c may correspond to the blocks 1310 to 1330/1340 of FIG. 13, respectively.

The communication unit 1410 may transmit and receive signals (e.g., data, control signals, etc.) to and from other wireless devices or base stations. The control unit 1420 may control the components of the hand-held device 1400 to perform various operations. The control unit 1420 may include an application processor (AP). The memory unit 1430 may store data/parameters/program/code/instructions necessary to drive the hand-held device 1400. In addition, the memory unit 1430 may store input/output data/information, etc. The power supply unit 1440a may supply power to the hand-held device 1400 and include a wired/wireless charging circuit, a battery, etc. The interface unit 1440b may support connection between the hand-held device 1400 and another external device. The interface unit 1440b may include various ports (e.g., an audio input/output port and a video input/output port) for connection with the external device. The input/output unit 1440c may receive or output video information/signals, audio information/signals, data and/or user input information. The input/output unit 1440c may include a camera, a microphone, a user input unit, a display 1440d, a speaker and/or a haptic module.

For example, in case of data communication, the input/output unit 1440c may acquire user input information/signal (e.g., touch, text, voice, image or video) from the user and store the user input information/signal in the memory unit 1430. The communication unit 1410 may convert the information/signal stored in the memory into a radio signal and transmit the converted radio signal to another wireless device directly or transmit the converted radio signal to a base station. In addition, the communication unit 1410 may receive a radio signal from another wireless device or the base station and then restore the received radio signal into original information/signal. The restored information/signal may be stored in the memory unit 1430 and then output through the input/output unit 1440c in various forms (e.g., text, voice, image, video and haptic).

Type of Wireless Device Applicable to the Present Disclosure

Figure 15:
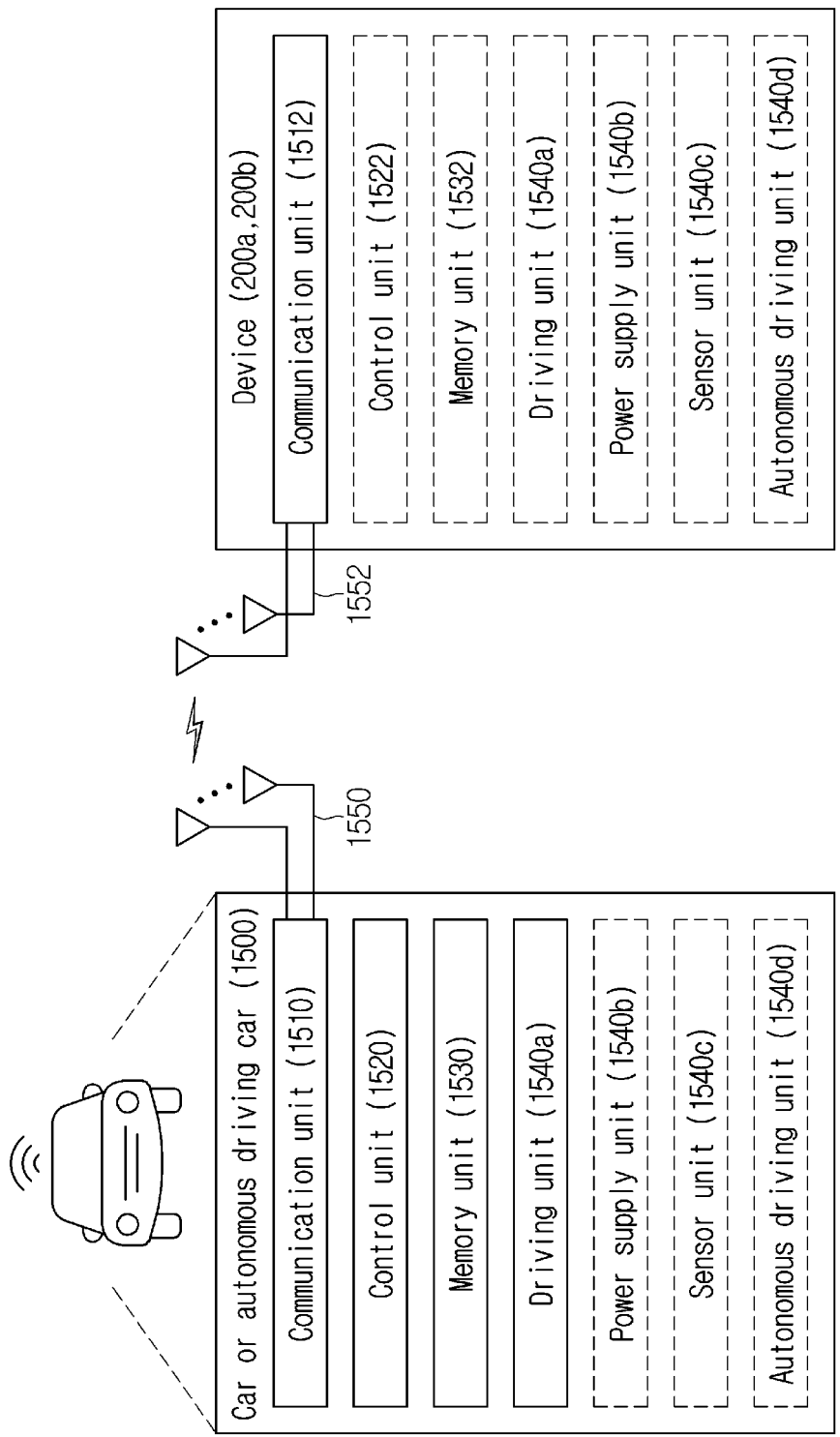
FIG. 15 is a view illustrating a car or an autonomous driving car applicable to the present disclosure.

FIG. 15 is a view showing an example of a car or an autonomous driving car applicable to the present disclosure.

FIG. 15 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 15, the car or autonomous driving car 1500 may include an antenna unit (antenna) 1508, a communication unit (transceiver) 1510, a control unit (controller) 1520, a driving unit 1540a, a power supply unit (power supply) 1540b, a sensor unit 1540c, and an autonomous driving unit 1540d. The antenna unit 1550 may be configured as part of the communication unit 1510. The blocks 1510/1530/1540a to 1540d correspond to the blocks 1410/1430/1440 of FIG. 14.

The communication unit 1510 may transmit and receive signals (e.g., data, control signals, etc.) to and from external devices such as another vehicle, a base station (e.g., a base station, a road side unit, etc.), and a server. The control unit 1520 may control the elements of the car or autonomous driving car 1500 to perform various operations. The control unit 1520 may include an electronic control unit (ECU). The driving unit 1540a may drive the car or autonomous driving car 1500 on the ground. The driving unit 1540a may include an engine, a motor, a power train, wheels, a brake, a steering device, etc. The power supply unit 1540b may supply power to the car or autonomous driving car 1500, and include a wired/wireless charging circuit, a battery, etc. The sensor unit 1540c may obtain a vehicle state, surrounding environment information, user information, etc. The sensor unit 1540c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 1540d may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 1510 may receive map data, traffic information data, etc. from an external server. The autonomous driving unit 1540d may generate an autonomous driving route and a driving plan based on the acquired data. The control unit 1520 may control the driving unit 1540a (e.g., speed/direction control) such that the car or autonomous driving car 1500 moves along the autonomous driving route according to the driving plane. During autonomous driving, the communication unit 1510 may aperiodically/periodically acquire latest traffic information data from an external server and acquire surrounding traffic information data from neighboring cars. In addition, during autonomous driving, the sensor unit 1540c may acquire a vehicle state and surrounding environment information. The autonomous driving unit 1540d may update the autonomous driving route and the driving plan based on newly acquired data/information. The communication unit 1510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 16:
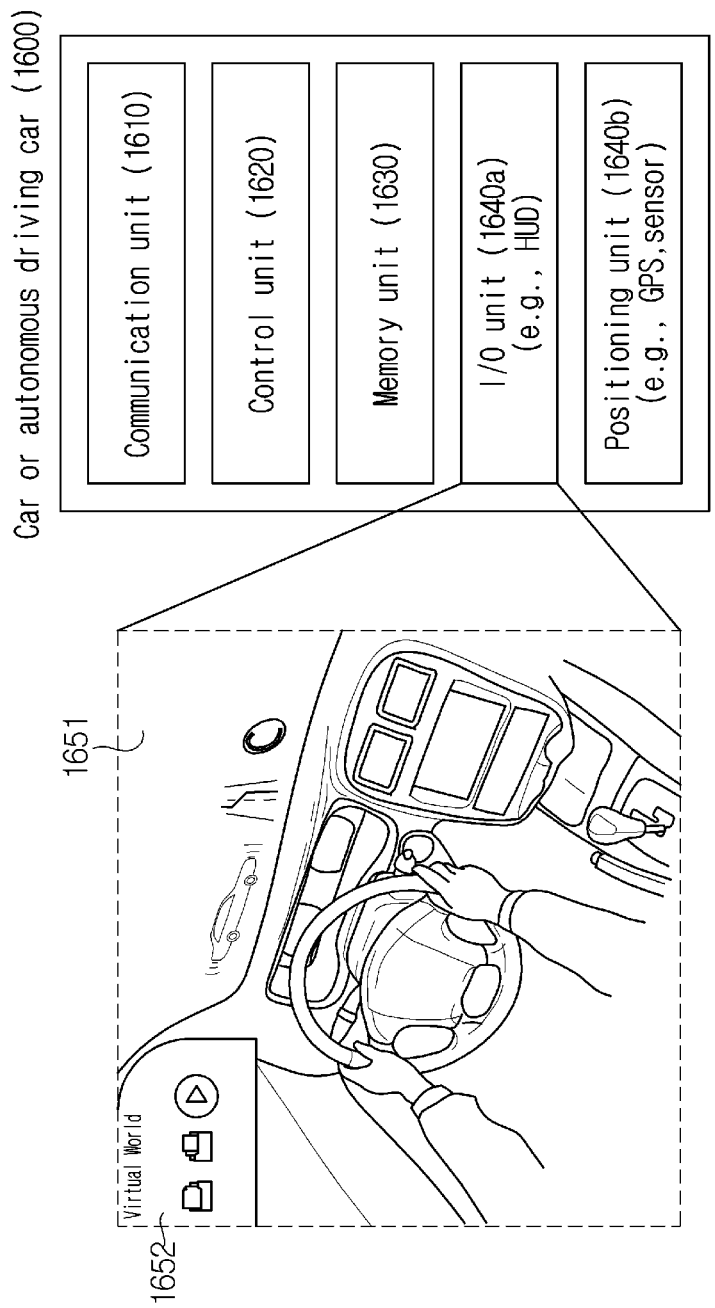
FIG. 16 is a view illustrating an example of a mobility applicable to the present disclosure.

FIG. 16 is a view showing an example of a mobility applicable to the present disclosure.

Referring to FIG. 16, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 16, the mobility 1600 may include a communication unit (transceiver) 1610, a control unit (controller) 1620, a memory unit (memory) 1630, an input/output unit 1640a and a positioning unit 1640b. Here, the blocks 1610 to 1630/1640a to 1640b may corresponding to the blocks 1310 to 1330/1340 of FIG. 13.

The communication unit 1610 may transmit and receive signals (e.g., data, control signals, etc.) to and from external devices such as another mobility or a base station. The control unit 1620 may control the components of the mobility 1600 to perform various operations. The memory unit 1630 may store data/parameters/programs/code/instructions supporting the various functions of the mobility 1600. The input/output unit 1640a may output AR/VR objects based on information in the memory unit 1630. The input/output unit 1640a may include a HUD. The positioning unit 1640b may acquire the position information of the mobility 1600. The position information may include absolute position information of the mobility 1600, position information in a driving line, acceleration information, position information of neighboring vehicles, etc. The positioning unit 1640*b* may include a global positioning system (GPS) and various sensors.

For example, the communication unit 1610 of the mobility 1600 may receive map information, traffic information, etc. from an external server and store the map information, the traffic information, etc. in the memory unit 1630. The positioning unit 1640*b* may acquire mobility position information through the GPS and the various sensors and store the mobility position information in the memory unit 1630. The control unit 1620 may generate a virtual object based on the map information, the traffic information, the mobility position information, etc., and the input/output unit 1640*a* may display the generated virtual object in a glass window (651 and 1652). In addition, the control unit 1620 may determine whether the mobility 1600 is normally driven in the driving line based on the mobility position information. When the mobility 1600 abnormally deviates from the driving line, the control unit 1620 may display a warning on the glass window of the mobility through the input/output unit 1640*a*. In addition, the control unit 1620 may broadcast a warning message for driving abnormality to neighboring mobilities through the communication unit 1610. Depending on situations, the control unit 1620 may transmit the position information of the mobility and information on driving/mobility abnormality to a related institution through the communication unit 1610.

Figure 17:
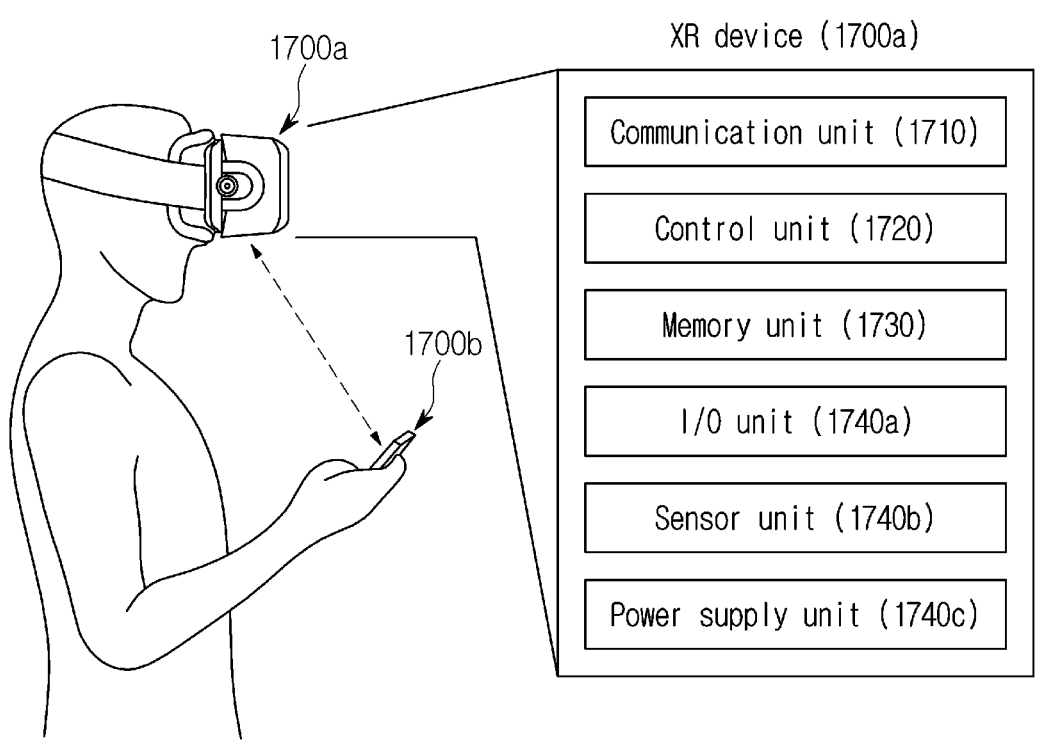
FIG. 17 is a view illustrating an example of an XR device applicable to the present disclosure.

FIG. 17 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 17, the XR device 1700*a* may include a communication unit (transceiver) 1710, a control unit (controller) 1720, a memory unit (memory) 1730, an input/output unit 1740*a*, a sensor unit 1740*b* and a power supply unit (power supply) 1740*c*. Here, the blocks 1710 to 1730/1740*a* to 1740*c* may correspond to the blocks 1310 to 1330/1340 of FIG. 13, respectively.

The communication unit 1710 may transmit and receive signals (e.g., media data, control signals, etc.) to and from external devices such as another wireless device, a hand-held device or a media server. The media data may include video, image, sound, etc. The control unit 1720 may control the components of the XR device 1700*a* to perform various operations. For example, the control unit 1720 may be configured to control and/or perform procedures such as video/image acquisition, (video/image) encoding, metadata generation and processing. The memory unit 1730 may store data/parameters/programs/code/instructions necessary to drive the XR device 1700*a* or generate an XR object.

The input/output unit 1740*a* may acquire control information, data, etc. from the outside and output the generated XR object. The input/output unit 1740*a* may include a camera, a microphone, a user input unit, a display, a speaker and/or a haptic module. The sensor unit 1740*b* may obtain an XR device state, surrounding environment information, user information, etc. The sensor unit 1740*b* may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 1740*c* may supply power to the XR device 1700*a* and include a wired/wireless charging circuit, a battery, etc.

For example, the memory unit 1730 of the XR device 1700*a* may include information (e.g., data, etc.) necessary to generate an XR object (e.g., AR/VR/MR object). The input/output unit 1740*a* may acquire an instruction for manipulating the XR device 1700*a* from a user, and the control unit 1720 may drive the XR device 1700*a* according to the driving instruction of the user. For example, when the user wants to watch a movie, news, etc. through the XR device 1700*a*, the control unit 1720 may transmit content request information to another device (e.g., a hand-held device 1700*b*) or a media server through the communication unit 1730. The communication unit 1730 may download/stream content such as a movie or news from another device (e.g., the hand-held device 1700*b*) or the media server to the memory unit 1730. The control unit 1720 may control and/or perform procedures such as video/image acquisition, (video/image) encoding, metadata generation/processing, etc. with respect to content, and generate/output an XR object based on information on a surrounding space or a real object acquired through the input/output unit 1740*a* or the sensor unit 1740*b*.

In addition, the XR device 1700*a* may be wirelessly connected with the hand-held device 1700*b* through the communication unit 1710, and operation of the XR device 1700*a* may be controlled by the hand-held device 1700*b*. For example, the hand-held device 1700*b* may operate as a controller for the XR device 1700*a*. To this end, the XR device 1700*a* may acquire three-dimensional position information of the hand-held device 1700*b* and then generate and output an XR object corresponding to the hand-held device 1700*b*.

Figure 18:
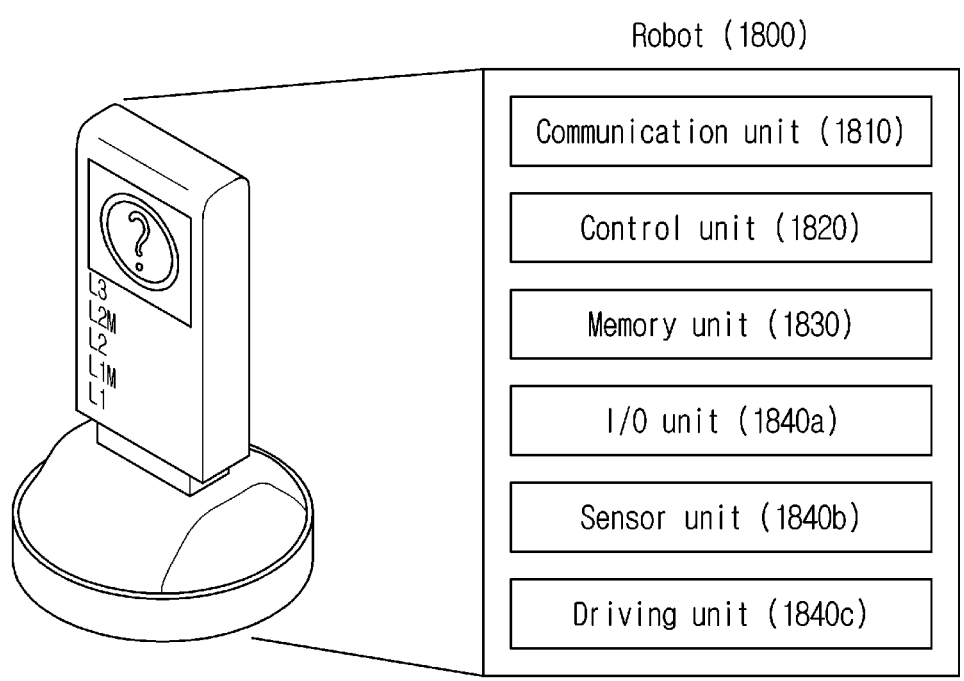
FIG. 18 is a view illustrating an example of a robot applicable to the present disclosure.

FIG. 18 is a view showing an example of a robot applicable to the present disclosure. For example, the robot may be classified into industrial, medical, household, military, etc. according to the purpose or field of use. At this time, referring to FIG. 18, the robot 1800 may include a communication unit (transceiver) 1810, a control unit (controller) 1820, a memory unit (memory) 1830, an input/output unit 1840*a*, sensor unit 1840*b* and a driving unit 1840*c*. Here, blocks 1810 to 1830/1840*a* to 1840*c* may correspond to the blocks 1310 to 1330/1340 of FIG. 13, respectively.

The communication unit 1810 may transmit and receive signals (e.g., driving information, control signals, etc.) to and from external devices such as another wireless device, another robot or a control server. The control unit 1820 may control the components of the robot 1800 to perform various operations. The memory unit 1830 may store data/parameters/programs/code/instructions supporting various functions of the robot 1800. The input/output unit 1840*a* may acquire information from the outside of the robot 1800 and output information to the outside of the robot 1800. The input/output unit 1840*a* may include a camera, a microphone, a user input unit, a display, a speaker and/or a haptic module.

The sensor unit 1840*b* may obtain internal information, surrounding environment information, user information, etc. of the robot 1800. The sensor unit 1840*b* may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 1840*c* may perform various physical operations such as movement of robot joints. In addition, the driving unit 1840c may cause the robot 1800 to run on the ground or fly in the air. The driving unit 1840c may include an actuator, a motor, wheels, a brake, a propeller, etc.

Figure 19:
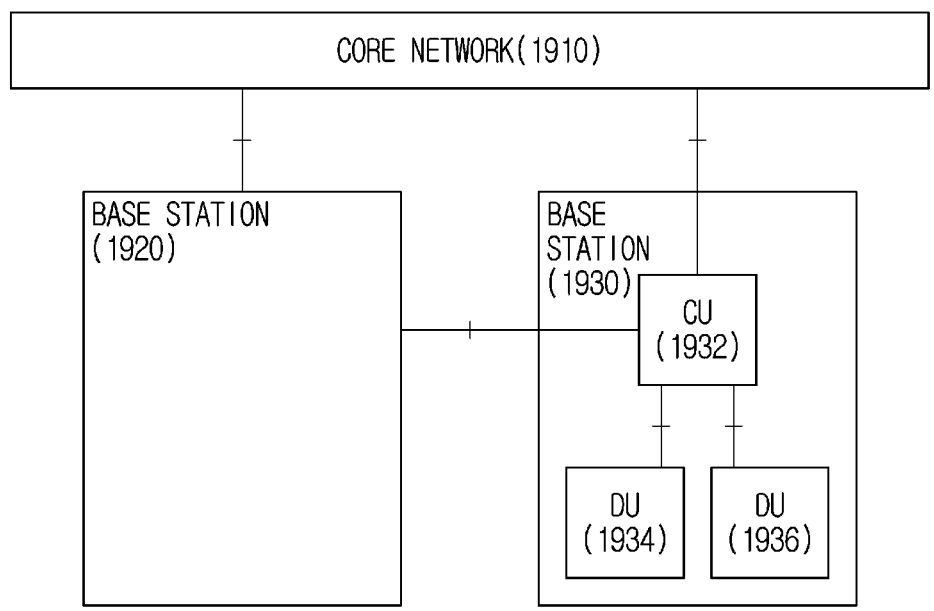
FIG. 19 is a view illustrating an example of a network node applicable to the present disclosure.

FIG. 19 is a view illustrating an example of a network node applicable to the present disclosure. FIG. 19 exemplifies a structure of a network node in which a base station is divided into a central unit (CU) and a distributed unit (DU).

Referring to FIG. 19, base stations 1920 and 1930 may be connected to a core network 1910, and the base station 1930 may be connected to the neighboring base station 1920. For example, an interface between the base stations 1920 and 1930 and the core network 1910 may be referred to as NG, and an interface between the base station 1930 and the neighboring base station 1920 may be referred to as Xn.

The base station 1930 may be divided into CU 1932 and DU 1934 and 1936. That is, the base station 1930 may be operated by being divided into layers. The CU 1932 may be connected to one or more DUs 1934 and 1936, and for example, an interface between the CU 1932 and the DUs 1934 and 1936 may be referred to as F1. The CU 1932 may perform a function of upper layers of the base station, and the DUs 1934 and 1936 may perform a function of lower layers of the base station. For example, the CU 1932 may be a logical node that hosts the radio resource control (RRC), service data adaptation protocol (SDAP) and packet data convergence protocol (PDCP) layers of a base station (e.g., gNB), and the DUs 1934 and 1936 may be a logical node that hosts the radio link control (RLC), media access control (MAC) and physical layers of a base station.

Alternatively, the CU 1932 may be a logical node that hosts the RRC and PDCP layers of a base station (e.g., En-gNB).

An operation of the DUs 1934 and 1936 may be partially controlled by the CU 1932. One DU 1934 and 1936 may support one or more cells. One cell may be supported only by one DU 1934 and 1936. One DU 1934 and 1936 may be connected to one CU 1932, and one DU 1934 and 1936 may be connected to a plurality of CUs by an appropriate implementation.

V2X

Supporting communications between a car and a person and between a car and a server, V2X aims to support more efficient and safer use of transportation. 3GPP defines the V2X technology as being supported in LTE and NR-based systems.

V2X communication can use a Uu interface and a PC5 interface, and the PC5 interface, which is also called sidelink, is more important especially for vehicles. As vehicles tend to keep moving, frequently communicate an area beyond a boundary of a base station and also exchange much data for safety purpose, PC5 with less delay is more advantageous than Uu.

Because of a privacy requirement, identifiers (e.g., Application layer ID, source layer-2 ID, IP address/prefix), which are used for a unicast mode of V2X communication through a PC4 reference point, may be changed over time. Accordingly, in order to prevent service interruption, a link identifier update procedure may be used to update peer UE associated with a unicast link facing an impending change of identifiers used for the link before the identifier change occurs. In case the UE possesses multiple unicast links using a plurality of same application layer IDs or layer-2 IDs, the UE needs to perform the link identifier update procedure for each unicast link.

Figure 20:
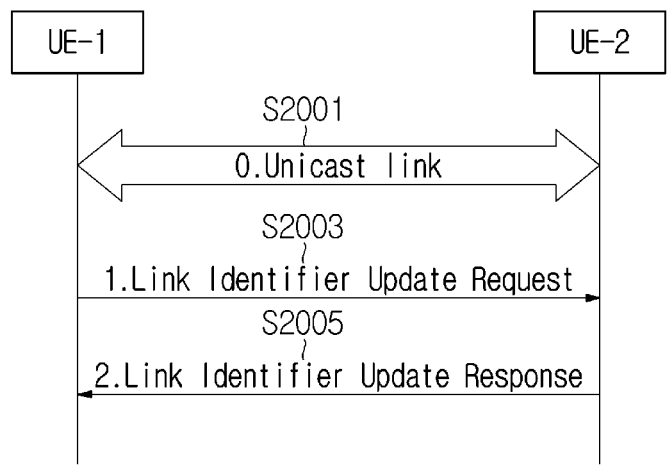
FIG. 20 is a view illustrating an embodiment of a link identifier update procedure applicable to the present disclosure.

FIG. 20 is a view illustrating an embodiment of a link identifier update procedure applicable to the present disclosure. FIG. 20 exemplifies a procedure for a link identifier update for a unicast link.

Referring to FIG. 20, at step S2001, a UE-1 and a UE-2 have a unicast link established according to a predetermined procedure. That is, the UE-1 and the UE-2 perform communication through a unicast link.

At step S2003, the UE-1 determines a change of identifiers and transmits a link identifier update request message to the UE-2. In other words, the UE-1 transmits the link identifier update request message before an ID is changed. For example, a change of identifier may be determined due to a change of an application layer ID or according to expiry of timer. Herein, the link identifier update request message may include new identifiers to be used. The new identifiers may include a new application layer ID, a new layer-2 ID, a new IP address/prefix. The new IP address/prefix may be included when IP communication is used. The new identifiers may be cyphered to protect privacy. Herein, the timer is driven according to each source layer-2 ID.

At step S2005, the UE-2 responds by using a link identifier update response message. As the link identifier update response message is received, the UE-1 and the UE-2 start using the new identifiers for data traffic. Until the link identifier update response message is received from the UE-2, the UE-1 may receive traffic using a previous layer-2 ID. A V2X layer of each UE passes down a PC5 link identifier for a unicast link and an updated layer-2 ID (e.g., destination Layer-2 ID in the case of UE-2 and source Layer-2 ID in the case of UE-1) to an AS layer. This enables the AS layer to update a layer-2 ID, which is provided for the unicast link.

Specific Embodiments of the Present Disclosure

In case a PC5 interface is used, every terminal may receive the PC5 interface. As a Uu interface informs each terminal of when an uplink radio resource is used and when a downlink radio resource is used, the terminal only needs to monitor a radio resource allocated to the terminal. However, in the case of the PC5 interface, it is not known when neighboring terminals actually transmit data, and due to a feature of a V2X application especially in view of safety, it is preferable to be ready for receiving information from any neighboring terminal (e.g., vehicle). Because of such a feature, when a user with malicious purpose keeps monitoring the PC5 interface, especially when a vehicle keeps using a same identifier, the vehicle may be easily subject to tracking, which is not preferable in view of security. Accordingly, a V2X application enables each vehicle to change its identifier periodically or at random. Thus, it may be prevented that some vehicle keeps track of another vehicle.

According to an embodiment, a terminal may operate as follows.

Terminals may perform connection establishment with other terminals according to a request of an application. A terminal (e.g., a terminal A), with another terminal (e.g., a terminal B), may establish a bearer and may use the established bearer to transmit and/or receive data using direct communication between terminals like PC5 interface. For a purpose like privacy protection, a terminal may recognize that a change of a layer-2 ID is needed, and the terminal A may start a procedure for changing the layer-2 ID.

For this, the terminal A may generate a link identifier update request message and transmit the link identifier update request message to the terminal B. In this case, in order to apply a new layer-2 ID at a same time as the terminal B, the terminal A may additionally designate a specific time (hereinafter referred to as 'reconfiguration time') by using a time reference value managed in a PC5 interface between the terminal A and the terminal B and may further include information related to the specific time in the link identifier update request message.

The terminal B, which receives the link identifier update request message, may recognize a change of an identifier of a terminal, based on a content of the link identifier update request message, store information included in the link identifier update request message, if an update of the identifier the terminal B is needed, generate a link identifier update response message including an identifier of the terminal B and transmit the link identifier update response message to the terminal A.

In case the link identifier update request message received from the terminal A includes reconfiguration time information, the terminal B may determine whether or not the terminal B is capable of accepting the reconfiguration time. For example, in case a security key associated with the update of the identifier should be newly generated, a predetermined processing time is required, and thus a change of a lower layer may be needed. Accordingly, as an example, in case that the message is received too late, that is, in case that reconfiguration of every item according to the update of the identifier cannot be completed within an activation time, the terminal B may determine that it is incapable of accepting the reconfiguration time. As another example, in case that the terminal B has a plurality of links to many other terminals at the same time, if there is an ongoing procedure with another terminal different from the terminal A requesting the update of the identifier, the terminal B may determine that reconfiguration of identifier and related items cannot be completed as requested within a suggested time.

In case the link identifier update request message received from the terminal A includes the reconfiguration time information and the terminal B is capable of applying a new identifier at a corresponding time, the terminal B may include a reconfiguration time with a same value in the link identifier update response message or include an indication for confirming the reconfiguration time in the link identifier update response message.

On the other hand, in case the link identifier update request message received from the terminal A includes the reconfiguration time information and the terminal B is incapable of applying a new identifier at a corresponding time, the terminal B may include information on a time, that is, a new reconfiguration time, in which it is capable of applying a changed context, in the link identifier update response message or may transmit a link identifier update reject message instead of the link identifier update response message. A cause value included in the link identifier update reject message may include information to the effect that a change is impossible in the reconfiguration time.

After receiving the link identifier update response message from the terminal B, the terminal A may operate as follows. The terminal A checks the reconfiguration time included in the link identifier update response message and identify whether the reconfiguration time is identical with a value that the terminal A transmitted before through the link identifier update request message.

In case the reconfiguration time included in the link identifier update response message is identical with the reconfiguration time included in the link identifier update request message, the terminal A may perform transmission and reception by using the layer-2 ID of the terminal A and the terminal B, which is in current use, until the reconfiguration time and may proceed transmission and reception by using a new layer-2 ID after the reconfiguration time.

On the other hand, in case the reconfiguration time included in the link identifier update response message is different from the reconfiguration time included in the link identifier update request message and the terminal A is capable of supporting a reconfiguration time that is newly suggested by the terminal B, the terminal A may perform transmission and reception by using the layer-2 ID of the terminal A and the terminal B, which is in current use, until the reconfiguration time and may perform transmission and reception by using a new layer-2 ID of the terminal A and the terminal B after the reconfiguration time. In this case, additionally, the terminal A may transmit, to the terminal B, information that the terminal A accepts the reconfiguration time value that is suggested by the terminal B.

The terminal A may receive the link identifier update reject message or other information from the terminal B. In this case, the terminal A may notify a new reconfiguration time to the terminal B by designating or transmitting a new reconfiguration time value or may cancel a link identifier update procedure.

In addition, during the above-described procedure, the terminal A may drive a timer when transmitting the link identifier update request message. If the terminal A does not receive a link identifier update response message from the terminal B before the timer expires, the terminal A may determine failure of the link identifier update procedure. In this case, the terminal A may suspend the link identifier update procedure or may consider there is a problem in a unicast link with the terminal B. Accordingly, the terminal A may perform an operation of reestablishing a unicast link with the terminal B or perform an operation of releasing the unicast link with the terminal B.

During the above-described procedure, each terminal may operate as follows at a time of changing to a new ID. For an ongoing HARQ process, each terminal may keep using an current ID and process a successfully received MAC PDU based on a context of a related link. In addition, for data received in relation to the ongoing HARQ process, each terminal may perform decoding by using a security parameter based on a previous ID. Then, for a new HARQ process, each terminal may use only a new ID and apply a new security parameter.

According to the above-described operations, a terminal may prevent data loss that occurs in a process of changing a link identifier. In the process, a PC5-S entity for managing the link identifier may enable at least one of MAC, RLC and PDCP to be adequately reestablished by subsequently forwarding information to the PC5-RRC.

According to an embodiment, a terminal may operate as follows.

Terminals may perform connection establishment with other terminals according to a request of an application. A terminal (e.g., a terminal A) together with another terminal (e.g., a terminal B) may establish a bearer and may use the established bearer to transmit and/or receive data using a direct communication interface like PC5 interface between terminals. In the description below, a layer-2 ID of the terminal A is referred to as ID A1, a layer-2 ID of the terminal B is referred to as ID B1, and a PC5 link between the two terminals is referred to as a link K. Herein, a physical layer may process only data, which are received according to scheduling associated with a combination of A1 and B1, in the link K. For a purpose like privacy protection, the terminal may recognize that a change of the layer-2 ID is needed. Accordingly, the terminal A may start a process of changing the layer 2-ID.

For this, the terminal A generates a link identifier update request message and transmits the link identifier update request message to the terminal B. Additionally, the terminal A may notify the ID A2 to a lower layer.

When receiving the link identifier update request message, the terminal B generates a link identifier update response message and transmits the link identifier update response message to the terminal A. In the description below, a newly forwarded layer-2 ID of the terminal A is referred to as ID A2, and a newly forwarded layer-2 ID of the terminal B is referred to as ID B2. Herein, a PC5-S layer of the terminal B notifies a lower layer that the ID A2 and the ID B2 are to be added to context information of the link K. Next, a lower layer of the terminal B may recognize data received based on scheduling information associated with a combination of ID A1/B1 and A2/B2 as data associated with the link K and may process the data. As for transmitting the link identifier update response message, a lower layer of the terminal B may use A1/B1 or A2/B2 to transmit relevant scheduling information.

The terminal A attempts reception in a PC5 interface by using an A1/B1 or A2/B1 combination. Thus, if the terminal A successfully receives the link identifier update response message transmitted by the terminal B, the terminal A notifies the ID B2, which is a new ID of the terminal B included in the link identifier update response message, to the lower layer. For processing data associated with a HARQ process associated with a combination of A1/B1 or A2/B1 during on-going HARQ processes, the lower layer, that received the ID B2, may keep using a scheduling combination of A1/B1 or A2/B1 until the HARQ process/buffer is flushed and may process the successfully received data in RLC/PDCP of a corresponding link K. In another case, that is, in case ID associated with receiving a subsequent new HARQ TB is not A2/B2, the lower layer, that received the ID B2, may not associate the HARQ TB with the link K anymore. In addition, for data blocks that are newly generated and transmitted after that, security based on a new key session ID and layer-2 ID may be applied. Then, after a predetermined time elapse, the A1/B1 may not be processed anymore, and the A1 and the B1 may be removed from a context of the link K.

After transmitting the link identifier update response message, the terminal B attempts reception based on an A1/B1 or A2/B2 combination. In case data associated with the A2/B2 combination is received, the terminal B may determine that the link identifier update response message is successfully transmitted to the terminal A and may operate as follows. For a HARQ process associated with the A1/B1 combination during on-going HARQ processes, the terminal B continues to receive data based on A1/B1 until the HARQ process/buffer is flushed. In addition, the terminal B may process successfully received data in RLC/PDCP of a corresponding link K. In another case, that is, in case ID associated with subsequent transmission of a new HARQ TB is not A2/B2, the terminal B may not associate the HARQ TB with the link K anymore and remove A1 and B1 from the context of the link K. In addition, for data blocks that are newly transmitted after that, the terminal B may apply security based on a new key session ID and layer-2 ID and apply the new security to a newly received data block.

According to the above-described operations, a terminal may prevent data loss that occurs in a process of changing a link identifier. In the above-described process, a PC5-S entity for managing a link identifier may operate to enable at least one layer of MAC, RLC and PDCP to be adequately reestablished by subsequently forwarding information to the PC5-RRC.

In the above-described procedure, during a procedure where new security is applied according to a time of changing ID, each security key such as a key applied for ciphering and a key applied for integrity may be generated based on an ID of each terminal. Accordingly, since keys are different before and before an ID is changed, a transmitting terminal may add an identifier for indicating which key is used (e.g., a key ID), into a transmitted PDU.

In this procedure, according to a change of a security key, for example, if a PDCP SN is initialized, a receiving terminal should manage an order of PDCP PDUs. The receiving terminal performs deciphering a received PDCP PDU using a security key set 1. Hereinafter, a key ID used herein is referred to as ID 1. Next, a layer-2 ID update operation is performed. In relation to a security context that is generated by the layer-2 ID update operation, a new key ID may be indicated in a PDCP PDU header. Hereinafter, the new key ID is referred to as ID 2.

After receiving the link identifier update response message, the terminal A ciphers a newly generated PDCP PDU by using a new security context and transmits the PDCP PDU. In this process, the terminal A may change a key and a key ID and use consecutive values for SNs. Next, a PDCP layer of the terminal B confirms a key ID value associated with the received PDU. If the key ID of the received PDU is 1, the terminal B deciphers data using a previous security value. If the key ID of the received PDU is 2, the terminal B deciphers data using a new security value.

At this time, in case a PDU received using ID 2 occurs, if an SN value of the PDU is a next SN value that the PDCP entity should receive, the terminal B processes the PDU and removes a security context associated with ID 1 from the PDCP entity. In case the SN value of the PDU is not the next SN value that the PDCP entity should receive and PDU is not received which has an SN value smaller than a confirmed SN value, the terminal B waits for the PDU until reordering is completed. In this process, a timer may be used to prevent the PDCP entity from waiting indefinitely. When the timer expires, a security context corresponding to ID 1 is not used anymore.

Alternatively, in this process, the terminal A may additionally initialize an SN value, while applying security associated with ID 2 to a new PDU. Then, the terminal B performs a deciphering operation according to a key ID of a received PDU. At this time, after completely receiving data encrypted with ID 1, the terminal B may expect to receive data encrypted with the ID 2. However, due to characteristics of an operation of HARQ in an MAC layer, a reception order of PDUs may be different as expected. For example, a PDU #1 and a PDU #2 are encrypted with ID 1 and a PDU #3 is encrypted with ID 2, but PDUs may be received in an order of the PDU #1, the PDU #3 and the PDU #2.

In case a key ID of a received PDU is the ID 2, the terminal B may store the received PDU using a separate reordering buffer. Alternatively, the terminal B may postpone processing the received PDU until reception of PDUs associated with the ID 1 is completed, that is, the terminal B may process the PDU associated with the ID 2 after a predetermined time elapses. Alternatively, the terminal B may finish a PDU reception operation associated with the ID 1. For example, the terminal B may not wait to receive a PDU associated with the ID 1 anymore or, even when a PDU associated with the ID 1 is received, the terminal B may remove the PDU and immediately start processing the PDU associated with the ID 2.

In case a key ID of a received PDU is the ID 1, the terminal B may process the received PDU according to an existing operation and not process a PDU further received after a predetermined time. In this process, the terminal A may notify a last PDU using the ID 1, or the terminal A may use a PDCP control PDU and the like in order to stop processing the ID 1 and to indicate whether or not to process a PDU of ID 2. For example, the terminal A may notify a last SN number transmitted by using the ID 1. For example, in case the last SN number is 7, if the terminal B receives all PDUs with an SN of 7 by using the ID 1, the terminal B may immediately start processing PDUs received with the ID 2.

According to another embodiment, while a terminal performs communication with another terminal by using a PC5 interface, in order to change an environment through synchronization, the terminal control the change through a physical control channel of sidelink. For example, by transmitting, by the terminal, and receiving, by the another terminal, a command in a physical channel that transmits an allocation schedule of resources in sidelink, the terminals may be synchronized with each other at the same time, for example, may apply a new identifier and a new security value.

Figure 21:
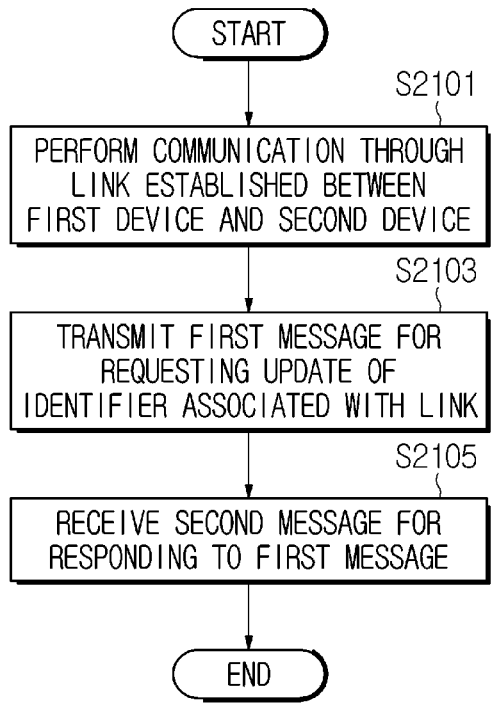
FIG. 21 is a view illustrating an embodiment of a procedure of changing an identifier associated with a sidelink in a device applicable to the present disclosure.

FIG. 21 is a view illustrating an embodiment of a procedure of changing an identifier associated with a sidelink in a device applicable to the present disclosure. FIG. 21 exemplifies an operation method of a first device that performs sidelink communication with a second device.

Referring to FIG. 21, at step S2101, the first device performs communication through a link established between the first device and the second device. Herein, the link may include a link for unicast of direct communication, that is, sidelink communication. That is, the first device may transmit data the second device or receive data through a link for unicast.

At step S2103, the first device transmits a first message for requesting an update of an identifier associated with the link. The identifier may be a parameter for processing scheduling information, data and the like associated with the link, for example, may include at least one of an application layer ID, a layer-2 ID, and a security key ID. The first message includes information related to a value of at least one new identifier. Herein, the at least one new identifier is related to at least one of an identifier of the first device to be updated (e.g., a layer-2 ID) and an identifier shared by the first device and the second device (e.g., a ciphering-related ID). The first message may be referred to as a link identifier update request message.

At step S2105, the first device receives a second message for responding to the first message. The second message includes information related to a value of at least one new identifier. Herein, the at least one new identifier is related to at least one of an identifier of the first device to be updated (e.g., the layer-2 ID), an identifier of the second device to be updated (e.g., the layer-2 ID), and an identifier shared by the first device and the second device (e.g., the ciphering-related ID). The second message may be referred to as a link identifier update response message.

Based on the operations described with reference to FIG. 21, corresponding operations of the second device communicating with the first device may be clearly understood. Corresponding to the operations of FIG. 21, the second device may perform sidelink communication with the first device through a link for unicast, receive the first message from the first device and transmit the second message to the first device.

Figure 22:
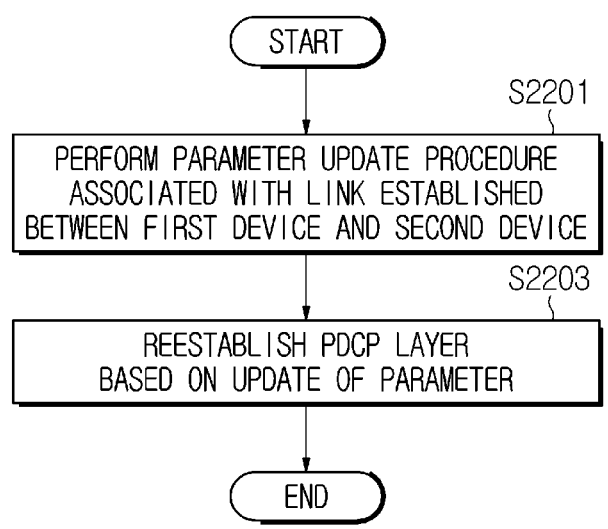
FIG. 22 is a view illustrating an embodiment of a procedure of reestablishing a packet data convergence protocol (PDCP) layer in a device applicable to the present disclosure.

FIG. 22 is a view illustrating an embodiment of a procedure of reestablishing a packet data convergence protocol (PDCP) layer in a device applicable to the present disclosure. FIG. 22 exemplifies an operation method of a first device that performs sidelink communication with a second device.

Referring to FIG. 22, at step S2201, the first device performs a parameter update procedure associated with a link established between the first device and the second device. Herein, the first device may be one of a device requesting an update of a parameter or a device accepting the update. For this, the first device may transmit and/or receive, to/from the second device, at least one message for updating the parameter. For example, the parameter includes at least one identifier associated with a link. The at least one identifier may include an identifier associated with the first device, an identifier associated with the second device, and an identifier shared both by the first device and by the second device. Specifically, the at least one identifier includes at least one of a layer-2 ID and a security-related ID.

At step S2203, a device reestablishes a PDCP layer based on the update of the parameter. The device may include a higher entity (e.g., a PC5-S entity) for managing the updated parameter (e.g., identifier) and a lower entity (e.g., a PDCP entity) for managing a PDCP layer. In this case, the higher entity may request or indicate a change of an identifier to a PDCP entity, and thus reestablishment of the PDCP entity may be performed. That is, the device may reestablish the PDCP entity.

Figure 23:
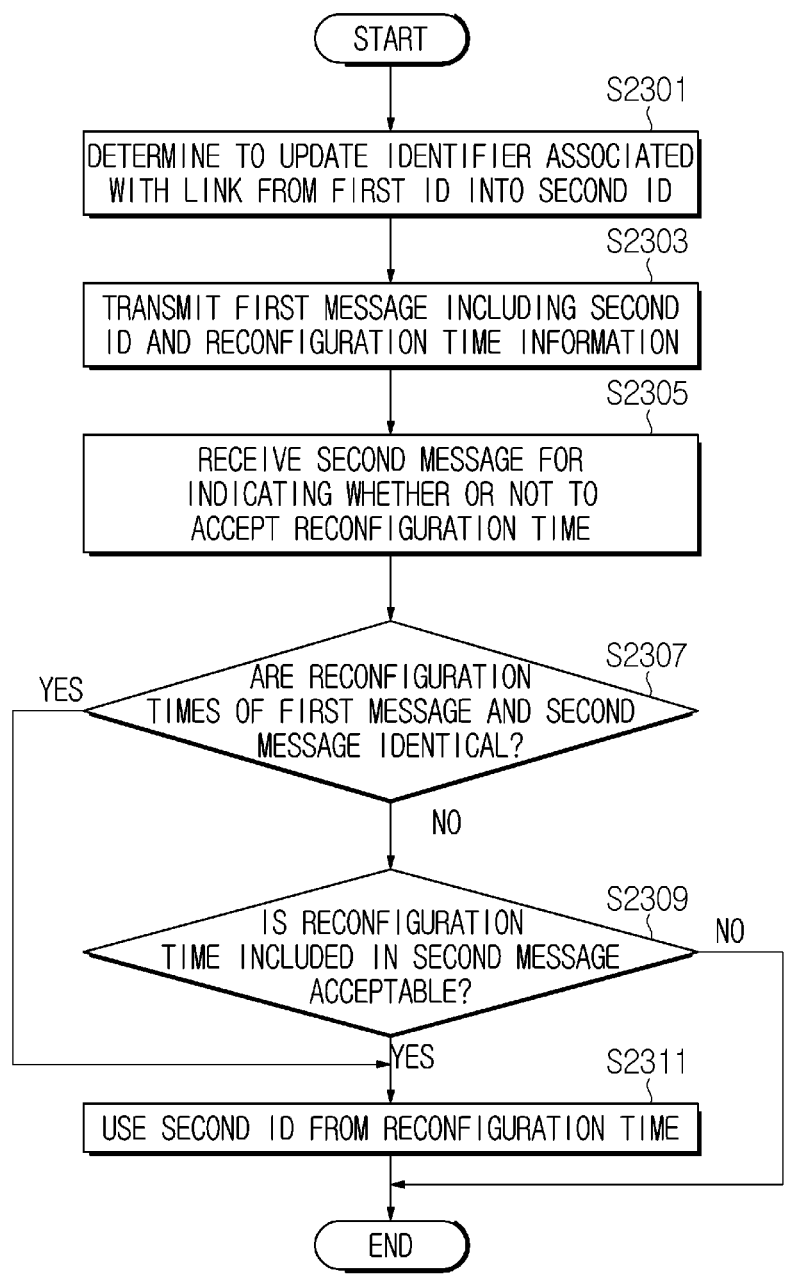
FIG. 23 is a view illustrating an embodiment of a procedure of changing an identifier associated with a sidelink by considering an application time of a new identifier in a device applicable to the present disclosure.

FIG. 23 is a view illustrating an embodiment of a procedure of changing an identifier associated with a sidelink by considering an application time of a new identifier in a device applicable to the present disclosure. FIG. 23 exemplifies an operation method of a first device that performs sidelink communication with a second device.

Referring to FIG. 23, at step S2301, the first device determines to update an identifier associated with a link from a first ID into a second ID. Herein, the link is intended to perform sidelink communication based on unicast, and the identifier may include at least one of an application layer ID, a layer-2 ID, and a security key ID.

At step S2303, the first device transmits a first message including information related to a second ID and a reconfiguration time. The reconfiguration time indicates an application time of the second ID. The reconfiguration time may be expressed as an absolute time value or a relative time value, and a unit of value may be a time or resource unit (e.g., subframe, frame, slot, TTI and the like).

At step S2305, the first device receives a second message for indicating whether or not to accept the reconfiguration time. The second message includes information related to whether or not to accept the reconfiguration time requested by the first device. The information related to whether or not to accept the requested reconfiguration time may include an indicator informing of either yes or no or may be defined in a same form as the information related to the reconfiguration time included in the first message.

At step S2307, the device identifies whether or not the reconfiguration times of the first message and the second message are identical with each other. In the information related to whether or not to accept the requested reconfiguration time is defined in a same form as the information related to the reconfiguration time included in the first message, whether or not the second device is to accept the reconfiguration time requested by the first device may be indicated depending on whether or not a value included in the first message and a value included in the second message are identical with each other. Accordingly, the first device checks whether or not the values are identical with each other. On the other hand, in case the information related to whether or not to accept the requested reconfiguration time is defined in a form of the indicator, this step S2307 may be replaced by an operation by which the first device identifies whether or not the indicator is set as a positive value.

If the reconfiguration times of the first message and the second message are not identical with each other, at step S2309, the first device determines whether or not the reconfiguration time included in the second message is acceptable. In other words, the first device determines whether or not the second ID is applicable at the reconfiguration time requested by the second device. For example, the device may determine whether to be capable to complete necessary processes until the requested reconfiguration time and to apply the new second ID by considering a desired time for reconfiguring an identifier and processing a subsequent operation and an ongoing procedure associated with another device, which is not the second device. Herein, if the reconfiguration time included in the second message is not acceptable, the first device finishes this procedure. Then, if necessary, the procedure for updating the identifier may be performed again.

If the reconfiguration times of the first message and the second message are identical with each other, or if the reconfiguration time requested by the second device is acceptable even though the reconfiguration times are not identical, at step S2311, the first device uses the second ID from the reconfiguration time. In other words, the first device may process data associated with the link by using the first ID until the reconfiguration time and may process data associated with the link by using the second ID after the reconfiguration time.

Figure 24:
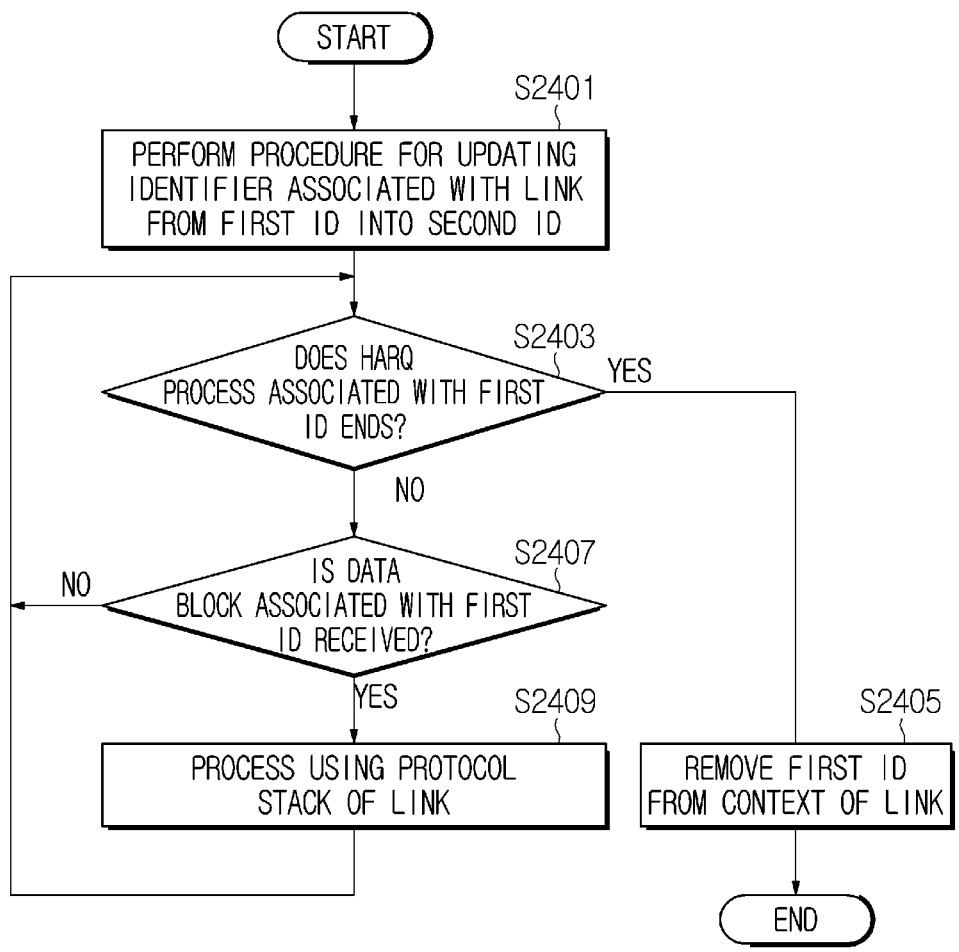
FIG. 24 is a view illustrating an embodiment of a procedure of controlling a context of a link according to a state of a HARQ process in a device applicable to the present disclosure.

FIG. 24 is a view illustrating an embodiment of a procedure of controlling a context of a link according to a state of a HARQ process in a device applicable to the present disclosure. FIG. 24 exemplifies an operation method of a first device that performs sidelink communication with a second device.

Referring to FIG. 24, at step S2401, the first device performs a procedure for updating an identifier associated with a link from a first ID into a second ID. Herein, the first device may be one of a device requesting an update of a parameter or a device accepting the update. For this, the first device may transmit and/or receive, to/from the second device, at least one message for updating the parameter. Accordingly, the first device may process a data block (e.g., security application) associated with the second ID based on the second ID.

At step S2403, the first device identifies whether or not a HARQ process associated with the first ID ends. That is, the first device identifies whether or not there is a HARQ process associated with an identifier value before update. The HARQ process may end when decoding of the data block is successful or a number of retransmissions exceeds a maximum number of retransmissions.

If the HARQ process associated with the first ID ends, at step S2405, the first device removes the first ID from a context of the link. That is, since all the data associated with the first ID are processed, the first device removes information related to the first ID.

Else the HARQ process associated with the first ID does not end, at step S2407, the first device identifies whether or not a data block associated with the first ID is received. That is, the first device identifies whether or not the data block associated with the first ID is received, while the HARQ process associated with the first ID is maintained.

If the data block associated with the first ID is received, at step S2409, the first device processes the data block by using a protocol stack of the link. The first device may decode data based on the present HARQ process and, if decoding is successful, may process the decoded data by using a RCL layer and a PDCP layer of a corresponding link. Next, the first device returns to step S2403.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

Embodiments of the present disclosure are applicable to various wireless access systems. As examples of the various wireless access systems, there are 3rd Generation Partnership Project (3GPP), 3GPP2 and the like.

Embodiments of the present disclosure are applicable not only to the various wireless access systems but also to all technical fields utilizing the various wireless access systems. Furthermore, the proposed method may be applied to mmWave and THz communication systems using very high frequency.

Additionally, embodiments of the present disclosure may be applied to various applications like autonomous cars and drones.

What is claimed is:

1. A method for operating a user equipment (UE) in a wireless communication system, the method comprising:
    performing communication through a link established between the UE and a second UE;
    transmitting a first message for requesting an update for an identifier of the link;
    receiving a second message in response to the first message; and
    reestablishing a packet data convergence protocol (PDCP) entity of the UE based on the update of the identifier,
    wherein the first message includes information related to a starting time to apply the updated identifier, and
    wherein the second message includes information related to whether to accept the starting time to apply the updated identifier.

2. The method of claim 1, wherein the PDCP entity is reestablished based on the update of the identifier being indicated from an upper layer of the UE.

3. The method of claim 1, wherein the first message includes a new identifier of the UE for the link, and
wherein the second message includes a new identifier of the second UE for the link.

4. The method of claim 1, wherein the identifier comprises at least one of a layer-2 identifier (ID) and a security key ID.

5. The method of claim 1, wherein the link comprises a link for a unicast sidelink communication.

6. A user equipment (UE) in a wireless communication system, the UE comprising:
a transceiver; and
at least one processor coupled with the transceiver and is configured to:
perform communication through a link established between the UE and a second UE,
transmit, by the transceiver, a first message for requesting an update for an identifier of the link,
receive, by the transceiver, a second message in response to the first message, and
reestablish a packet data convergence protocol (PDCP) entity of the UE based on the update of the identifier,
wherein the first message includes information related to a starting time to apply the updated identifier, and
wherein the second message includes information related to whether to accept the starting time to apply the updated identifier.

7. The UE of claim 6, wherein the PDCP entity is reestablished based on the update of the identifier being indicated from an upper layer of the UE.

8. The UE of claim 6, wherein the first message includes a new identifier of the first UE for the link, and
wherein the second message includes a new identifier of the second UE for the link.

9. The UE of claim 6, wherein the identifier comprises at least one of a layer-2 identifier (ID) and a security key ID.

10. The UE of claim 6, wherein the link comprises a link for a unicast sidelink communication.

* * * * *